US009251700B2

(12) United States Patent  
Cregg et al.

(10) Patent No.: US 9,251,700 B2  
(45) Date of Patent: Feb. 2, 2016

(54) METHODS AND SYSTEMS FOR POWERLINE AND RADIO FREQUENCY COMMUNICATIONS

(71) Applicant: SmartLabs, Inc., Irvine, CA (US)

(72) Inventors: Daniel Brian Cregg, Lake Elsinore, CA (US); Marcus Paul Escobosa, Lake Forest, CA (US)

(73) Assignee: SmartLabs, Inc., Irvine, CA (US)

( * ) Notice: Subject to any disclaimer, the term of this patent is extended or adjusted under 35 U.S.C. 154(b) by 126 days.

(21) Appl. No.: 14/065,346

(22) Filed: Oct. 28, 2013

(65) Prior Publication Data

US 2015/0116097 A1   Apr. 30, 2015

(51) Int. Cl.
| | |
|---|---|
| *G08C 19/12* | (2006.01) |
| *H04L 27/26* | (2006.01) |
| *G08C 17/02* | (2006.01) |
| *G06F 1/32* | (2006.01) |

(52) U.S. Cl.
CPC ................ *G08C 19/12* (2013.01); *G08C 17/02* (2013.01); *H04L 27/2601* (2013.01); *H04L 27/2605* (2013.01); *G06F 1/3206* (2013.01); *H04B 2203/542* (2013.01); *H04B 2203/5416* (2013.01)

(58) Field of Classification Search
CPC ..... G08C 19/12; G06F 1/3206; G06F 1/3209; H04L 27/2601; H04L 27/2605; H04L 27/2655; H04B 2203/542; H04B 2203/5416; H04B 2203/5408; H04B 2203/5441; H04B 2203/5479
USPC ...................................................... 340/13.22
See application file for complete search history.

(56) References Cited

U.S. PATENT DOCUMENTS

| | | | | |
|---|---|---|---|---|
| 5,148,159 | A * | 9/1992 | Clark et al. | ................... 340/5.25 |
| 6,734,784 | B1 * | 5/2004 | Lester | ......................... 340/12.33 |
| 7,034,899 | B2 * | 4/2006 | Symoen et al. | ................ 348/734 |
| 7,345,998 | B2 | 3/2008 | Cregg et al. | |
| 7,528,716 | B2 * | 5/2009 | Jackson | .................... 340/539.23 |
| 8,081,649 | B2 | 12/2011 | Cregg et al. | |
| 8,223,783 | B2 * | 7/2012 | Shorty et al. | ................... 370/406 |
| 8,331,544 | B2 | 12/2012 | Kraus et al. | |
| 8,358,197 | B2 | 1/2013 | Tran | |
| 8,558,697 | B2 | 10/2013 | Clough | |
| 2002/0146993 | A1 | 10/2002 | Persico et al. | |

(Continued)

FOREIGN PATENT DOCUMENTS

| | | |
|---|---|---|
| CN | 101833802 B | 1/2012 |
| KR | 101034957 B1 | 5/2011 |
| KR | 1020120105614 A | 9/2012 |

*Primary Examiner* — Firmin Backer  
*Assistant Examiner* — Adnan Aziz  
(74) *Attorney, Agent, or Firm* — Knobbe Martens Olson & Bear LLP

(57) ABSTRACT

Disconnected from the powerline, a battery-powered receiver is configured to conserve power. The receiver communicates information between a local controller and a communication network that uses the powerline and a radio frequency (RF) band to propagate messages. An antenna wirelessly detects the presence of the powerline carrier signal that radiates into free space, which indicates a first message encoded onto the powerline. A computer processor wakes up from an inactive state based on the presence of the carrier signal and receives a second message via a second RF signal having a different frequency than the powerline carrier signal, and determines whether the device address in the second message is the assigned address of the receiver. If the message is not addressed to the receiver, the receiver returns to an inactive state.

20 Claims, 22 Drawing Sheets

(56) References Cited

U.S. PATENT DOCUMENTS

| | | | |
|---|---|---|---|
| 2003/0098777 A1 | 5/2003 | Taylor et al. | |
| 2003/0103521 A1 | 6/2003 | Raphaeli et al. | |
| 2003/0142685 A1 | 7/2003 | Bare | |
| 2004/0243684 A1 | 12/2004 | Ha et al. | |
| 2006/0126617 A1 | 6/2006 | Cregg et al. | |
| 2006/0164206 A1 | 7/2006 | Buckingham et al. | |
| 2006/0196926 A1 | 9/2006 | Benson et al. | |
| 2007/0162536 A1* | 7/2007 | Ostrovsky et al. | 709/200 |
| 2007/0290793 A1 | 12/2007 | Tran | |
| 2008/0106241 A1* | 5/2008 | Deaver et al. | 323/209 |
| 2008/0130673 A1* | 6/2008 | Cregg et al. | 370/432 |
| 2009/0051528 A1 | 2/2009 | Graichen | |
| 2010/0277286 A1* | 11/2010 | Burkart et al. | 340/10.34 |
| 2011/0051721 A1* | 3/2011 | Brothwell | H04B 3/54 370/353 |
| 2011/0109433 A1 | 5/2011 | Kuenzi et al. | |
| 2012/0253535 A1* | 10/2012 | Newman, Jr. | H05B 39/044 700/295 |
| 2013/0008958 A1 | 1/2013 | Smith et al. | |
| 2013/0090744 A1 | 4/2013 | Tran | |
| 2013/0124883 A1* | 5/2013 | Addepalli | G06F 1/28 713/310 |
| 2013/0176107 A1 | 7/2013 | Dumas et al. | |
| 2013/0201009 A1* | 8/2013 | Lin et al. | 340/13.23 |
| 2013/0237193 A1 | 9/2013 | Dumas et al. | |
| 2013/0246543 A1 | 9/2013 | Pasek | |
| 2014/0001977 A1* | 1/2014 | Zacharchuk et al. | 315/291 |
| 2014/0129606 A1 | 5/2014 | Cate et al. | |
| 2014/0180487 A1* | 6/2014 | Bull | 700/295 |
| 2014/0192912 A1* | 7/2014 | Chappel et al. | 375/260 |
| 2015/0082033 A1 | 3/2015 | Bruce et al. | |
| 2015/0116075 A1 | 4/2015 | Cregg et al. | |
| 2015/0116080 A1 | 4/2015 | Cregg et al. | |
| 2015/0116082 A1 | 4/2015 | Cregg et al. | |
| 2015/0160626 A1 | 6/2015 | Cregg et al. | |
| 2015/0161884 A1 | 6/2015 | Cregg et al. | |

* cited by examiner

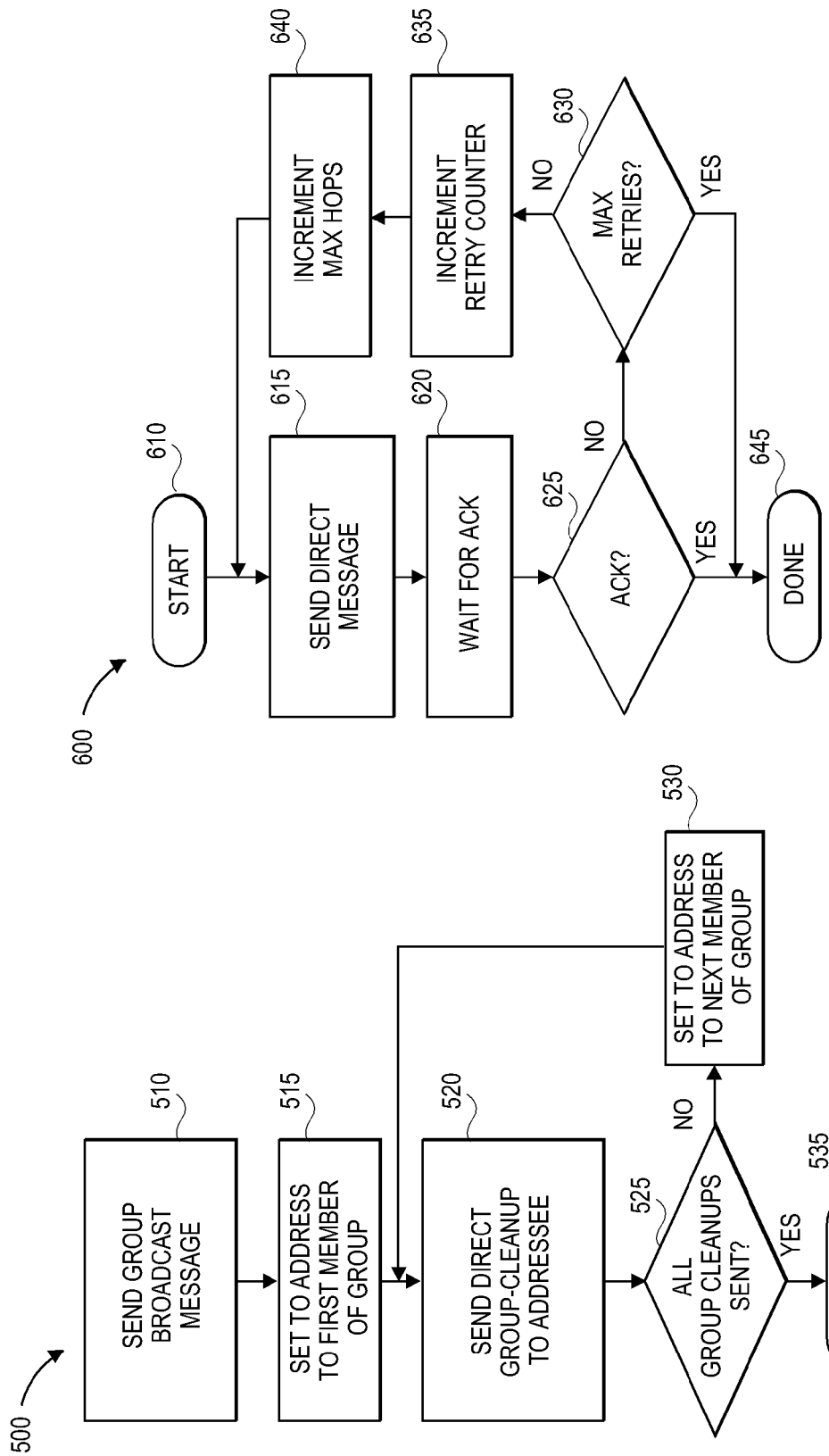

1700

| Center Frequency | 915 MHz |
| --- | --- |
| Data Encoding Method | Mancester |
| Modulation Method | FSK |
| FSK Deviation | 64 KHz |
| FSK Symbol Rate | 76,800 symbols per second |
| Data Rate | 38,400 bits per second |
| Range | 150 feet outdoors |

FIG. 17

METHODS AND SYSTEMS FOR POWERLINE AND RADIO FREQUENCY COMMUNICATIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Communication among low-cost devices is useful in many applications. For example, in a home environment, room occupancy sensors, light switches, lamp dimmers, and a gateway to the Internet can all work together if they are in communication. A room in a home could be illuminated when people are present, or else an alarm could be sounded, depending on conditions established by a program running on a remote computer.

Home automation systems can use existing powerline wiring as a communication network to communicate messages between devices that receive power from the powerline. However, many devices operate remotely from the household powerline wiring, such as battery operated devices and low voltage devices, and are prevented from communicating over the powerline network.

SUMMARY

A communication system including a local controller and a local receiver is disclosed. In certain embodiments, the local controller and the local receiver are battery operated and configured to save power for longer battery life. The local controller is further configured to control an operation, such as locking/unlocking a door, raising/lowering window blinds, and the like. The local controller receives sensor data and sends messages which may be based on the sensor data to the local receiver. The local receiver is configured to transmit and receive electromagnetic signals and to synchronize with devices on a simulcast mesh communication network that utilizes powerline signaling and radio frequency signaling to propagate messages. In an embodiment, the mesh network comprises an INSTEON® network.

The local receiver periodically checks for message from the local controller. To conserve power, the local receiver may wait for an interrupt from the local controller which provides an indication that the local controller has a message to send through the network. Once synchronized with the network, the local receiver transmits the message as a modulated radio frequency signal to the network. Devices on the network can propagate the message through the network using more than one medium. For instance, the devices can encode the message onto a carrier signal added to a powerline waveform and sent at the powerline zero crossings and the devices can send the message as the modulated radio frequency signal.

To further conserve power, the local receiver may wait for activity on the powerline before checking if there is a message for it to pass on to the local controller. Once a message addressed to the local receiver is detected, the local receiver decodes the message and passes the instructions to the local controller.

In an embodiment, the local controller comprises a door lock controller having a sensor, such as a motion sensor or an RF envelope sensor, and a rule set to determine whether the door lock controller permits operation of a keypad associated with the door lock.

The door controller sends messages containing door lock data to the local receiver and receives messages containing door lock commands from the local receiver. In turn, the local receiver interfaces with a hub device through the network. The hub receives the door lock data, applies a rule set to make lock operation decisions, and sends messages, which may comprise commands to operate the door lock, through the network to the local receiver. The local receiver decodes the messages and passes the commands to the door lock controller to control the door lock.

In situations where the door is instructed to unlock, electronic circuitry or magnetic switching can be used to check whether the door unlocked. In other situations where the door is instructed to lock, the electronic circuitry or magnetic switching can be used to check whether the door locked. When the checking mechanism indicates that the message was not received or the lock operation failed, the system can alert the user to take appropriate lock action.

In another embodiment, the local controller comprises a window blind controller to control the raising and lowering of blinds, as well as adjusting the angle of the slates in the blinds. The window blind controller receives data, such as command data from a remote or sensor data from sensors associated with a window. The window blind controller sends messages including window blind data to the local receiver and receives messages containing window blind commands from the local receiver. In turn, the local receiver interfaces with the hub device through the network. The hub receives the window blind data, applies a rule set to make window blind decisions, and sends messages, which may comprise commands to operate the window blinds, through the network to the local receiver. The local receiver decodes the messages and passes the commands to the window blind controller to control the window blind.

Embodiments of the window blind rule sets determine the window blind operation to be performed and prioritization when there are multiple rule sets. For example, the window blind controller receives information pertaining to temperature or lighting intensity from sensors associated with the blinds and sends messages to the hub. The hub sends commands to control the blinds to reduce the sunlight entering the room. The hub can also dim or switch electric lighting in response to changing daylight availability.

According to a number of embodiments, the disclosure relates to a battery-powered apparatus operating remotely from a powerline and configured to interface with a mesh network. The apparatus comprises an antenna configured to wirelessly detect a presence of a first radio frequency (RF) signal having a first frequency, where the presence of the first RF signal indicates a first message encoded onto a powerline, and the antenna is electrically disconnected from the powerline, memory storing an assigned address, where the memory is electrically disconnected from the powerline, a computer processor operably coupled to the memory and configured to wake up from an inactive state upon receipt of the presence of the first RF signal. The computer processor is further configured to receive a second message comprising a device address via a second RF signal having a second frequency different than the first frequency and to determine whether the device address of the second message is the assigned address. The computer processor returns to the inactive state to save power when the device address of the second message is not the assigned address, where the computer processor is electrically disconnected from the powerline. The apparatus further comprises a power supply comprising a battery and configured to supply power, where the power supply is electrically connected to the memory and the computer processor.

In an embodiment, the computer processor is further configured to format at least a part of the second message into a first serial bit stream when the device address of the second message is the assigned address. In an embodiment, the mesh network comprises a plurality of devices electrically coupled to the powerline and configured to transmit and receive messages synchronously using powerline signaling and radio frequency (RF) signaling based on zero-crossings of the powerline. The powerline signaling comprises data modulated onto a carrier signal having the first frequency and the data modulated carrier signal added to the powerline, and the RF signaling comprises the data modulated onto the second RF signal having the second frequency.

In an embodiment, the apparatus further comprises RF receive circuitry configured to receive the second RF signal, wherein the second RF signal is modulated with data comprising the second message, where the RF receive circuitry further configured to demodulate the modulated second RF signal and recover the second message. The apparatus further comprises a second antenna configured to detect an electromagnetic signal generated by an alternating current of the powerline, and a zero crossing detector operably coupled to the second antenna and configured to detect the zero crossings of the powerline based on the electromagnetic signal. The memory further stores a wake up number, and the zero crossing detector is further configured to count the detected zero crossings of the powerline and to wake up the computer processor when the count equals the wake up number.

In an embodiment, the apparatus further comprises a second antenna configured to detect an electromagnetic signal generated by the alternating current of the powerline, and a zero crossing detector operably coupled to the second antenna and configured to detect the zero crossings of the powerline based on the electromagnetic signal, where the carrier signal detector is configured to wake up the computer processor based at least in part on the first RF signal and the detected zero crossings of the powerline. In an embodiment, the computer processor wakes up during an RF message transmission period of the mesh network and is inactive between a beginning of a first packet of a powerline message and an end of a last packet of the powerline message.

In an embodiment, the apparatus further comprises a carrier signal detector operably coupled to the first antenna and configured to generate an interrupt based on the first RF signal. In some embodiments, the first message and the second message are the same and in other embodiments, the first message and the second message are different.

Certain embodiments relate to a method to conserve power and interface with a mesh network. The method comprises wirelessly detecting with an antenna a presence of a first radio frequency (RF) signal having a first frequency. The presence of the first RF signal indicates a first message encoded onto the powerline, and the antenna is electrically disconnected from the powerline. The method further comprises waking up a computer processor from an inactive state based on the presence of the first RF signal, where the computer processor is electrically disconnected from the powerline, and after waking up the computer processor, wirelessly receiving a second message via a second RF signal having a second frequency different than the first frequency and comprising a device address, and determining whether the device address of the second message is an assigned address. The method further comprises returning the computer processor to the inactive state to save power when the device address of the second message is not the assigned address, and supplying operating power to the computer processor from a battery-operated power supply and not supplying the operating power from the powerline.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 5 illustrates a process to transmit messages to groups of devices within the communication network, according to certain embodiments.

FIG. 6 illustrates a process to transmit direct messages with retries to devices within the communication network, according to certain embodiments.

FIG. 17 is a table of exemplary specifications for RF signaling within the communication network, according to certain embodiments.

DETAILED DESCRIPTION OF THE PREFERRED EMBODIMENT

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the inventions and not to limit the scope of the disclosure.

Disconnected from the powerline, a battery-powered local receiver is configured to conserve power. The receiver communicates information between a local controller and a communication network that uses powerline signaling and radio frequency (RF) signaling to propagate messages. The powerline signaling comprises message data modulated onto a carrier signal and the data modulated carrier signal is added to the powerline waveform. The RF signaling comprises the message data modulated onto an RF signal, where the RF signal and the carrier signal are different frequencies.

Figure 1A:
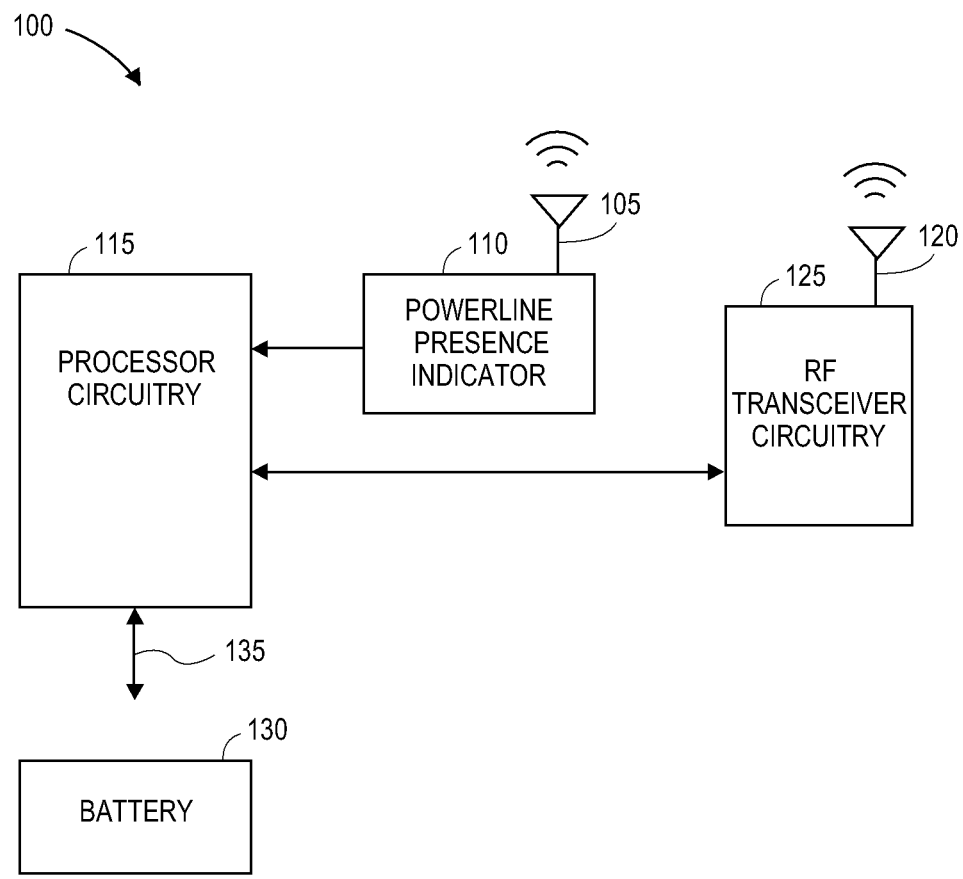
FIG. 1A is a block diagram illustrating a local receiver, according to certain embodiments.

FIG. 1A is a block diagram illustrating a local receiver 100 comprising a first antenna 105, a powerline presence indicator 110, computer processor circuitry 115, a second antenna 120, RF transceiver circuitry 125, and a battery 130. The local receiver 100 is not electrically connected to the powerline and does not receive power from the powerline. The battery 130 supplies the operating power for the local receiver 100.

The first antenna is tuned approximately to the frequency of the carrier signal used to carry messages over the powerline and wirelessly detects the presence of the powerline carrier signal that radiates into free space when there are messages sent over the powerline from the communication network. The presence of the carrier signal indicates a first message encoded onto the powerline. The processor circuitry 115 wakes up from an inactive state based on the presence of the carrier signal.

The second antenna 120 is configured to receive and transmit RF messages to and from the communication network. The RF transceiver circuitry 125 receives message data from the processor circuitry 115 and modulates the message data for transmission through the antenna 120 to the communication network, as well as receiving RF signals from the antenna 120 and demodulating the RF signal to send the message data to the processor circuitry 115.

Once awaked by the presence of message activity on the powerline, the processor circuitry 115 receives a second message from the communication network via the antenna 120 and the RF transceiver circuitry 125. In an embodiment, the processor circuitry 115 determines whether the device address in the second message is the assigned address of the local receiver 100. If the message is not addressed to the local receiver 100, the local receiver 100 returns to an inactive state to conserve power. If the message is addressed to the local receiver 100, the local receiver 100 communicates the message over a communication bus 135 to a local controller.

In some embodiments, the local receiver 100 communicates messages between the communication network and a door lock control system where the local controller comprises a door lock controller.

Figure 1B:
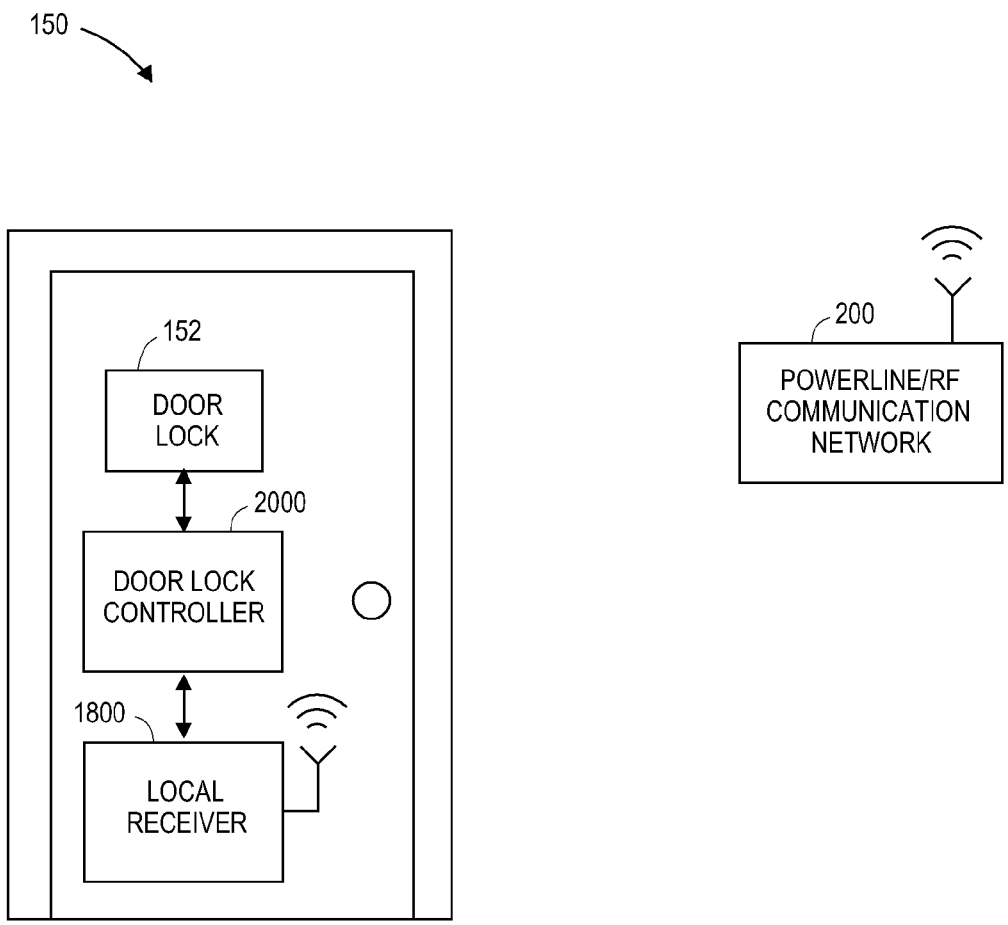
FIG. 1B is a block diagram illustrating a door lock control system, according to certain embodiments.

FIG. 1B is a block diagram illustrating an embodiment of a door lock control system 150 comprising a door lock 152, a local controller 2000, a local receiver 1800, and a communication network 200. In an embodiment, the local controller 2000 comprises a door lock controller that is configured to control the door lock 152 and to communicate through the local receiver 1800 to the communication network 200. In an embodiment, the door lock controller 2000 comprises the door lock 152. In another embodiment, the door lock controller 2000 comprises the local receiver 1800. In a further embodiment, the network 200 comprises the local receiver 1800.

The door lock 152 is associated with a door and is configured to lock the door and to unlock the door. The door lock controller 2000 is configured to control the door lock 152 and to confirm the state of the door; that is, to confirm that the door is locked after controlling the door lock 152 to lock the door and to confirm that the door is unlocked after controlling the door lock 152 to unlock the door. The door lock controller 2000 receives data from one or more of the door lock 152, a user in proximity to the door lock 152, and from the network 200. In an embodiment, the door controller 2000 determines whether to activate a keypad associated with the door lock 152 based at least in part on the data. In other embodiments, the door controller 2000 sends the data from the door lock 152 to the local receiver 1800, which passes the data to the network 200, and receives commands and/or data from network 200 through the local receiver 1800. In certain embodiments, the door lock 152, the door controller 2000 and the local receiver 1800 are located in or near the door and/or the door jam.

The local receiver 1800 is configured to format data from the door lock controller 2000 into one or more messages and transmit the one or more messages to the network 200 using radio frequency (RF) signaling. The local receiver 1800 is further configured to receive RF messages from the network 200, decode the messages, and pass the data and/or commands from the network 200 to the door lock controller 2000.

Network

The network 200 is configured to receive messages from the local receiver 1800 and pass the messages to a hub within the network which decodes the messages. The network 200 is further configured to receive data and/or commands from the network hub and propagate the messages to the local receiver 1800.

In an embodiment, the network 200 comprises a dual-band mesh area networking topology to communicate with devices located within the network 200. In an embodiment, the network 200 comprises an INSTEON® network utilizing an INSTEON® engine employing a powerline protocol and an RF protocol. The devices can comprise, for example, light switches, thermostats, motion sensors, and the like. INSTEON® devices are peers, meaning each device can transmit, receive, and repeat any message of the INSTEON® protocol, without requiring a master controller or routing software.

Figure 2:
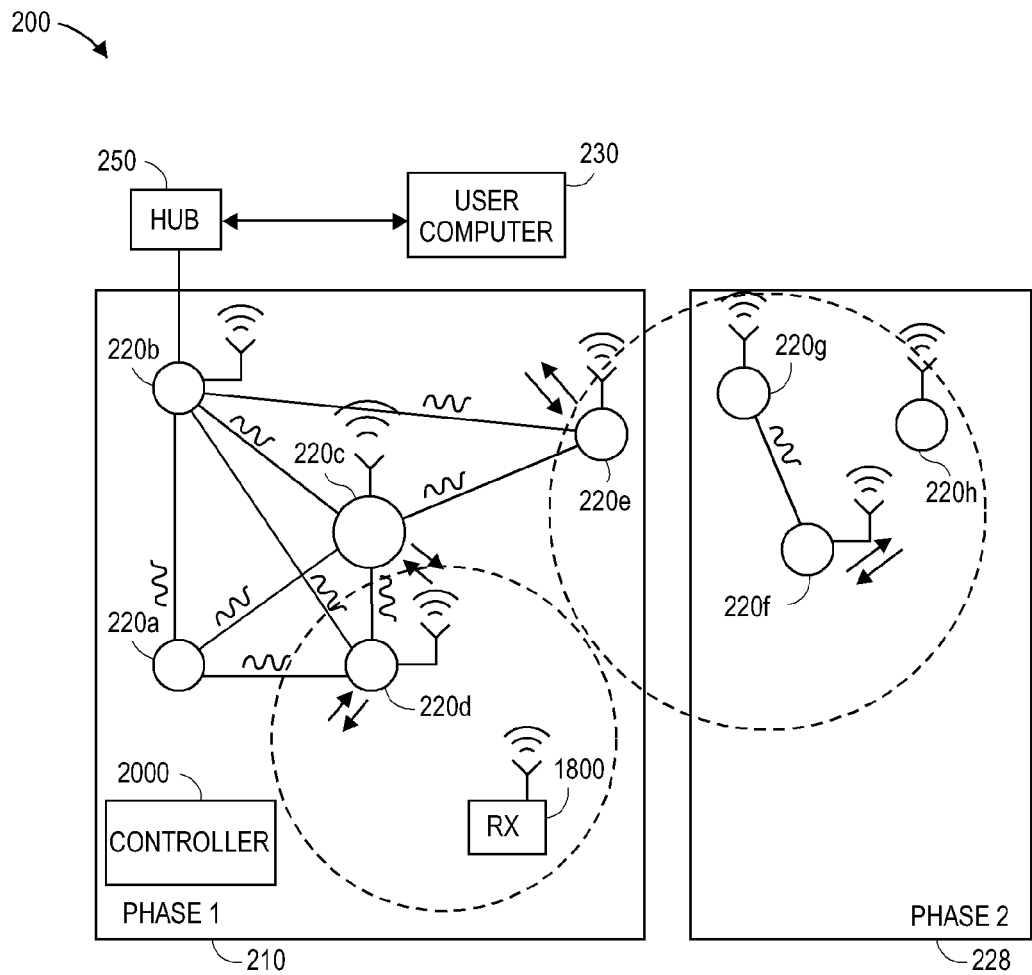
FIG. 2 is a block diagram of a powerline and radio frequency communication network, according to certain embodiments.

FIG. 2 illustrates the communication network 200 of control and communication devices 220 communicating over the network 200 using one or more of powerline signaling and RF signaling. The network 200 further comprises the local receiver 1800 communicating over the network 200 using the RF signaling. In an embodiment, the communication network 200 comprises a mesh network. In another embodiment, the communication network 200 comprises a simulcast mesh network. In a further embodiment, the communication network 200 comprises an INSTEON® network.

Electrical power is most commonly distributed to buildings and homes in North America as single split-phase alternating current. At the main junction box to the building, the three-wire single-phase distribution system is split into two two-wire 110 VAC powerlines, known as Phase 1 and Phase 2. Phase 1 wiring is typically used for half the circuits in the building and Phase 2 is used for the other half. In the exemplary network 200, devices 220a-220e are connected to a Phase 1 powerline 210 and devices 220f-220h are connected to a Phase 2 powerline 228.

In the network 200, device 220a is configured to communicate over the powerline; device 220h is configured to communicate via RF; and devices 220b-220g are configured to communicate over the powerline and via RF. Additionally device 220b can be configured to communicate to a hub 250 and the hub 250 can be configured to communicate with a computer 230 and other digital equipment using, for example, RS232, USB, IEEE 802.3, or Ethernet protocols and communication hardware. Hub 250 on the network 200 communicating with the computer 230 and other digital devices can, for example, bridge to networks of otherwise incompatible devices in a building, connect to computers, act as nodes on a local-area network (LAN), or get onto the global Internet. In an embodiment, the computer 230 comprises a personal computer, a laptop, a tablet, a smartphone, or the like, and interfaces with a user.

Further, hub 250 can be configured to receive messages containing data from the local controller 2000 via the local receiver 1800 and the network 200. The hub 250 can further be configured to provide information to a user through the computer 230, and can be configured to provide data and/or commands to the local controller 2000 via the local receiver 1800 and the network 200.

In an embodiment, devices 220a-220g that send and receive messages over the powerline use the INSTEON® Powerline protocol, and devices 220b-220h that send and receive radio frequency (RF) messages use the INSTEON® RF protocol, as defined in U.S. Pat. Nos. 7,345,998 and 8,081,649 which are hereby incorporated by reference herein in their entireties. INSTEON® is a trademark of the applicant.

Devices 220b-220h that use multiple media or layers solve a significant problem experienced by devices that only communicate via the powerline, such as device 220a, or by devices that only communicate via RF, such as device 220h. Powerline signals on opposite powerline phases 210 and 228 are severely attenuated because there is no direct circuit connection for them to travel over. RF barriers can prevent direct RF communication between devices RF only devices. Using devices capable of communicating over two or more of the communication layers solves the powerline phase coupling problem whenever such devices are connected on opposite powerline phases and solves problems with RF barriers between RF devices. Thus, within the network 200, the powerline layer assists the RF layer, and the RF layer assists the powerline layer.

As shown in FIG. 2, device 220a is installed on powerline Phase 1 210 and device 220f is installed on powerline Phase 2 228. Device 220a can communicate via powerline with devices 220b-220e on powerline Phase 1 210, but it can also communicate via powerline with device 220f on powerline Phase 2 228 because it can communicate over the powerline to device 220e, which can communicate to device 220f using RF signaling, which in turn is directly connected to powerline Phase 2 228. The dashed circle around device 220f represents the RF range of device 220f. Direct RF paths between devices 220e to 220f (1 hop), for example, or indirect paths between devices 220c to 220e and between devices 220e to 220f, for example (2 hops) allow messages to propagate between the powerline phases.

Each device 220a-220h is configured to repeat messages to others of the devices 220a-220h on the network 200. In an embodiment, each device 220a-220h is capable of repeating messages, using the protocols as described herein. Further, the devices 220a-220h and 1800 are peers, meaning that any device can act as a master (sending messages), slave (receiving messages), or repeater (relaying messages). Adding more devices configured to communicate over more than one physical layer increases the number of available pathways for messages to travel. Path diversity results in a higher probability that a message will arrive at its intended destination.

For example, RF device 220d desires to send a message to device 220e, but device 220e is out of range. The message will still get through, however, because devices within range of device 220d, such as devices 220a-220c will receive the message and repeat it to other devices within their respective ranges. There are many ways for a message to travel: device 220d to 220c to 220e (2 hops), device 220d to 220a to 220c to 220e (3 hops), device 220d to 220b to 220a to 220c to 220e (4 hops) are some examples.

Figure 3:
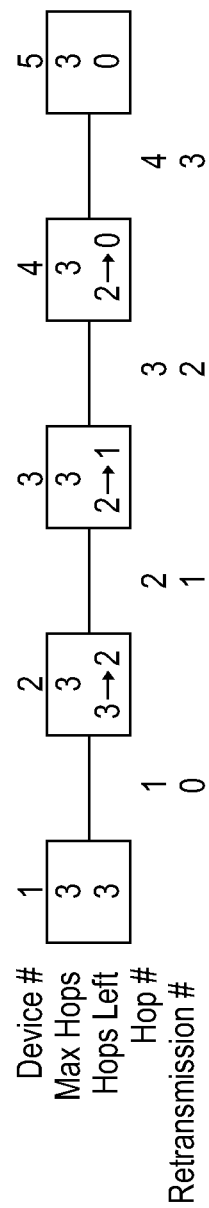
FIG. 3 is a block diagram illustrating message retransmission within the communication network, according to certain embodiments.

FIG. 3 is a block diagram illustrating message retransmission within the communication network 200. In order to improve network reliability, the devices 220 retransmit messages intended for other devices on the network 200. This increases the range that the message can travel to reach its intended device recipient.

Unless there is a limit on the number of hops that a message may take to reach its final destination, messages might propagate forever within the network 200 in a nested series of recurring loops. Network saturation by repeating messages is known as a "data storm." The message protocol avoids this problem by limiting the maximum number of hops an individual message may take to some small number. In an embodiment, messages can be retransmitted a maximum of three times. In other embodiments, the number of times a message can be retransmitted is less than 3. In further embodiments, the number of times a message can be retransmitted is greater than 3. The larger the number of retransmissions, however, the longer the message will take to complete.

Embodiments comprise a pattern of transmissions, retransmissions, and acknowledgements that occurs when messages are sent. Message fields, such as Max Hops and Hops Left manage message retransmission. In an embodiment, messages originate with the 2-bit Max Hops field set to a value of 0, 1, 2, or 3, and the 2-bit Hops Left field set to the same value. A Max Hops value of zero tells other devices 220 within range not to retransmit the message. A higher Max Hops value tells devices 220 receiving the message to retransmit it depending on the Hops Left field. If the Hops Left value is one or more, the receiving device 220 decrements the Hops Left value by one and retransmits the message with the new Hops Left value. Devices 220 that receive a message with a Hops Left value of zero will not retransmit that message.

Also, the device 220 that is the intended recipient of a message will not retransmit the message, regardless of the Hops Left value.

In other words, Max Hops is the maximum retransmissions allowed. All messages "hop" at least once, so the value in the Max Hops field is one less than the number of times a message actually hops from one device to another. In embodiments where the maximum value in this field is three, there can be four actual hops, comprising the original transmission and three retransmissions. Four hops can span a chain of five devices. This situation is shown schematically in FIG. 3.

Figure 4:
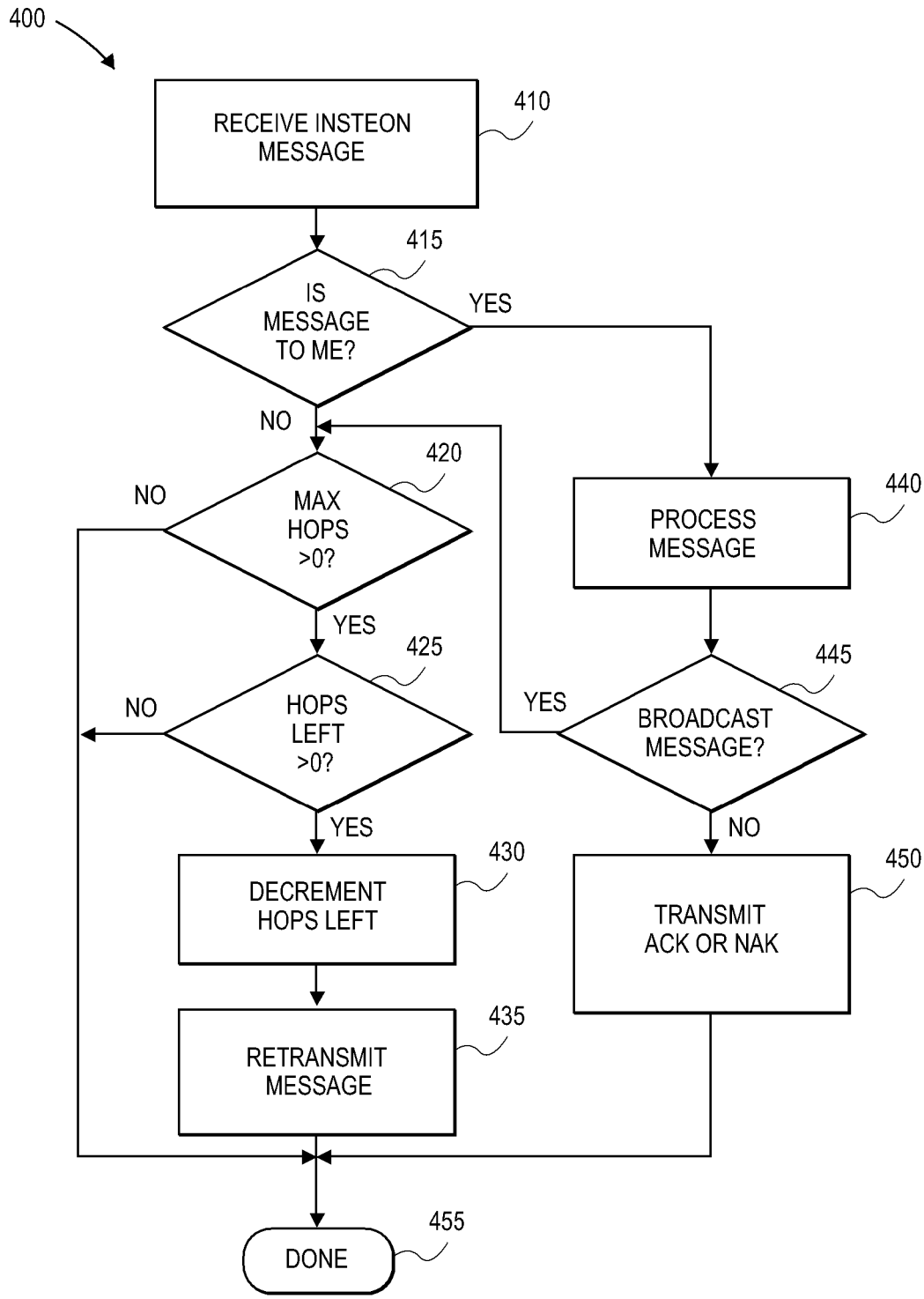
FIG. 4 illustrates a process to receive messages within the communication network, according to certain embodiments.

FIG. 4 illustrates a process 400 to receive messages within the communication network 200. The flowchart in FIG. 4 shows how the device 220 receives messages and determines whether to retransmit them or process them. At step 410, the device 220 receives a message via powerline or RF.

At step 415, the process 400 determines whether the device 220 needs to process the received message. The device 220 processes Direct messages when the device 220 is the addressee, processes Group Broadcast messages when the device 220 is a member of the group, and processes all Broadcast messages.

If the received message is a Direct message intended for the device 220, a Group Broadcast message where the device 220 is a group member, or a Broadcast message, the process 400 moves to step 440. At step 440, the device 220 processes the received message.

At step 445, the process 400 determines whether the received message is a Group Broadcast message or one of a Direct message and Direct group-cleanup message. If the message is a Direct or Direct Group-cleanup message, the process moves to step 450. At step 450, the device sends an acknowledge (ACK) or a negative acknowledge (NAK) message back to the message originator in step 450 and ends the task at step 455.

In an embodiment, the process 400 simultaneously sends the ACK/NAK message over the powerline and via RF. In another embodiment, the process 400 intelligently selects which physical layer (powerline, RF) to use for ACK/NAK message transmission. In a further embodiment, the process 400 sequentially sends the ACK/NAK message using a different physical layer for each subsequent retransmission.

If at step 445, the process 400 determines that the message is a Broadcast or Group Broadcast message, the process 400 moves to step 420. If, at step 415, the process 400 determines that the device 220 does not need to process the received message, the process 400 also moves to step 420. At step 420, the process 400 determines whether the message should be retransmitted.

At step 420, the Max Hops bit field of the Message Flags byte is tested. If the Max Hops value is zero, process 400 moves to step 455, where it is done. If the Max Hops filed is not zero, the process moves to step 425, where the Hops Left filed is tested.

If there are zero Hops Left, the process 400 moves to step 455, where it is finished. If the Hops Left field is not zero, the process 400 moves to step 430, where the process 400 decrements the Hops Left value by one.

At step 435, the process 400 retransmits the message. In an embodiment, the process 400 simultaneously retransmits the message over the powerline and via RF. In another embodiment, the process 400 intelligently selects which physical layer (PL, RF) to use for message retransmission. In a further embodiment, the process 400 sequentially retransmits the message using a different physical layer for each subsequent retransmission.

FIG. 5 illustrates a process 500 to transmit messages to multiple recipient devices 220 in a group within the communication network 200. Group membership is stored in a database in the device 220 following a previous enrollment process. At step 510, the device 220 first sends a Group Broadcast message intended for all members of a given group. The Message Type field in the Message Flags byte is set to signify a Group Broadcast message, and the To Address field is set to the group number, which can range from 0 to 255. The device 220 transmits the message using at least one of powerline and radio frequency signaling. In an embodiment, the device 220 transmits the message using both powerline and radio frequency signaling.

Following the Group Broadcast message, the transmitting device 220 sends a Direct Group-cleanup message individually to each member of the group in its database. At step 515 the device 220 first sets the message To Address to that of the first member of the group, then it sends a Direct Group-cleanup message to that addressee at step 520. If Group-cleanup messages have been sent to every member of the group, as determined at step 525, transmission is finished at step 535. Otherwise, the device 220 sets the message To Address to that of the next member of the group and sends the next Group-cleanup message to that addressee at step 520.

FIG. 6 illustrates a process 600 to transmit direct messages with retries to the device 220 within the communication network 200. Direct messages can be retried multiple times if an expected ACK is not received from the addressee. The process begins at step 610.

At step 615, the device 220 sends a Direct or a Direct Group-cleanup message to an addressee. At step 620 the device 220 waits for an Acknowledge message from the addressee. If, at step 625, an Acknowledge message is received and it contains an ACK with the expected status, the process 600 is finished at step 645.

If, at step 625, an Acknowledge message is not received, or if it is not satisfactory, a Retry Counter is tested at step 630. If the maximum number of retries has already been attempted, the process 600 fails at step 645. In an embodiment, devices 220 default to a maximum number of retries of five. If fewer than five retries have been tried at step 630, the device 220 increments its Retry Counter at step 635. At step 640, the device 220 will also increment the Max Hops field in the Message Flags byte, up to a maximum of three, in an attempt to achieve greater range for the message by retransmitting it more times by more devices 220. The message is sent again at step 615.

Figure 7:
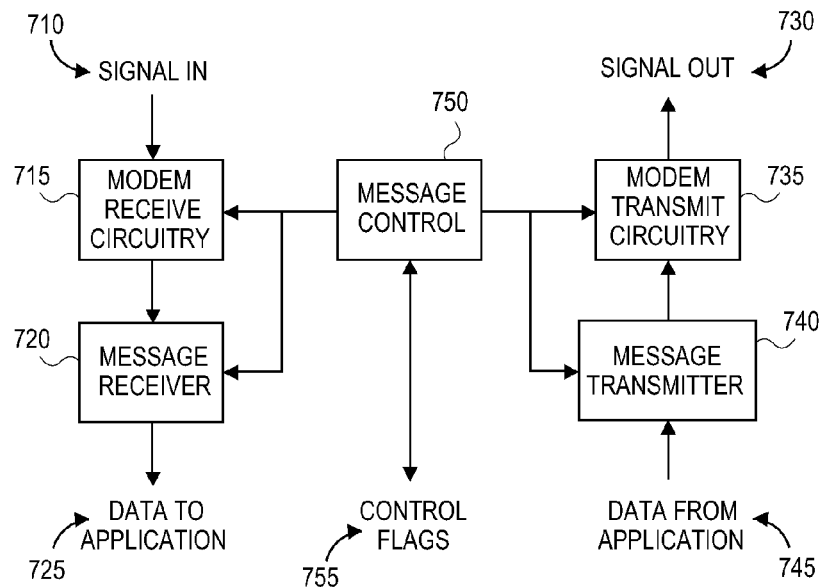
FIG. 7 is a block diagram illustrating the overall flow of information related to sending and receiving messages over the communication network, according to certain embodiments.

The devices 220 comprise hardware and firmware that enable the devices 220 to send and receive messages. FIG. 7 is a block diagram of the device 220 illustrating the overall flow of information related to sending and receiving messages. Received signals 710 come from the powerline, via radio frequency, or both. Signal conditioning circuitry 715 processes the raw signal and converts it into a digital bitstream. Message receiver firmware 720 processes the bitstream as required and places the message payload data into a buffer 725 which is available to the application running on the device 220. A message controller 750 tells the application that data is available using control flags 755.

To send a message, the application places message data in a buffer 745, then tells the message controller 750 to send the message using the control flags 755. Message transmitter 740 processes the message into a raw bitstream, which it feeds to a modem transmitter 735. The modem transmitter 735 sends the bitstream as a powerline signal, a radio frequency signal, or both.

Figure 8:
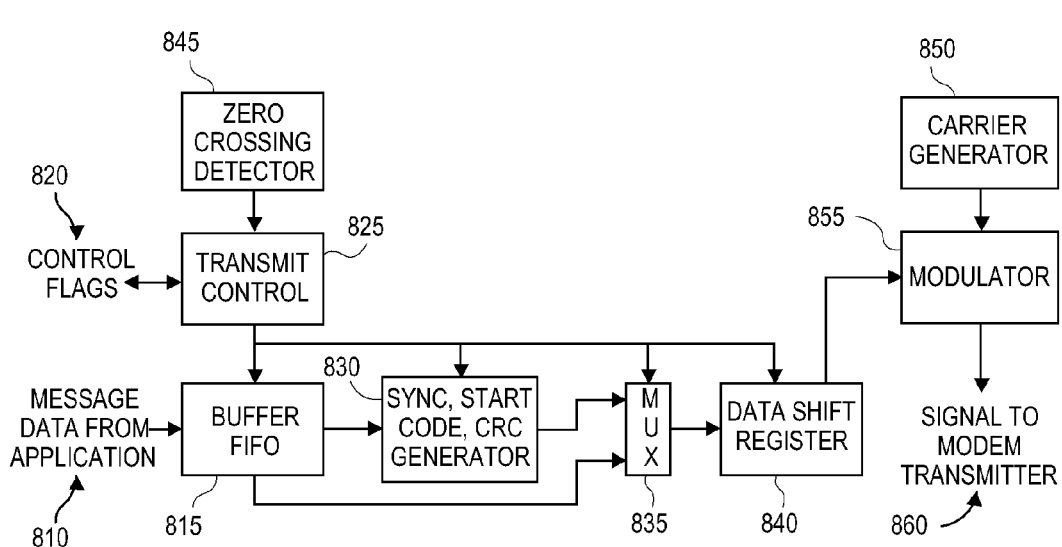
FIG. 8 is a block diagram illustrating the overall flow of information related to transmitting messages on the powerline, according to certain embodiments.

FIG. 8 shows the message transmitter 740 of FIG. 7 in greater detail and illustrates the device 220 sending a message on the powerline. The application first composes a message 810 to be sent, excluding the cyclic redundancy check (CRC) byte, and puts the message data in a transmit buffer 815. The application then tells a transmit controller 825 to send the message by setting appropriate control flags 820. The transmit controller 825 packetizes the message data using multiplexer 835 to put sync bits and a start code from a generator 830 at the beginning of a packet followed by data shifted out of the first-in first-out (FIFO) transmit buffer 815.

As the message data is shifted out of FIFO transmit buffer 815, the CRC generator 830 calculates the CRC byte, which is appended to the bitstream by the multiplexer 835 as the last byte in the last packet of the message. The bitstream is buffered in a shift register 840 and clocked out in phase with the powerline zero crossings detected by zero crossing detector 845. The phase shift keying (PSK) modulator 855 shifts the phase of an approximately 131.65 kHz carrier signal from carrier generator 850 by 180 degrees for zero-bits, and leaves the carrier signal unmodulated for one-bits. In other embodiments, the carrier signal can be greater than or less than approximately 131.65 kHz. Note that the phase is shifted gradually over one carrier period as disclosed in conjunction with FIG. 11. Finally, the modulated carrier signal is applied to the powerline by the modem transmit circuitry 735 of FIG. 7.

Figure 9:
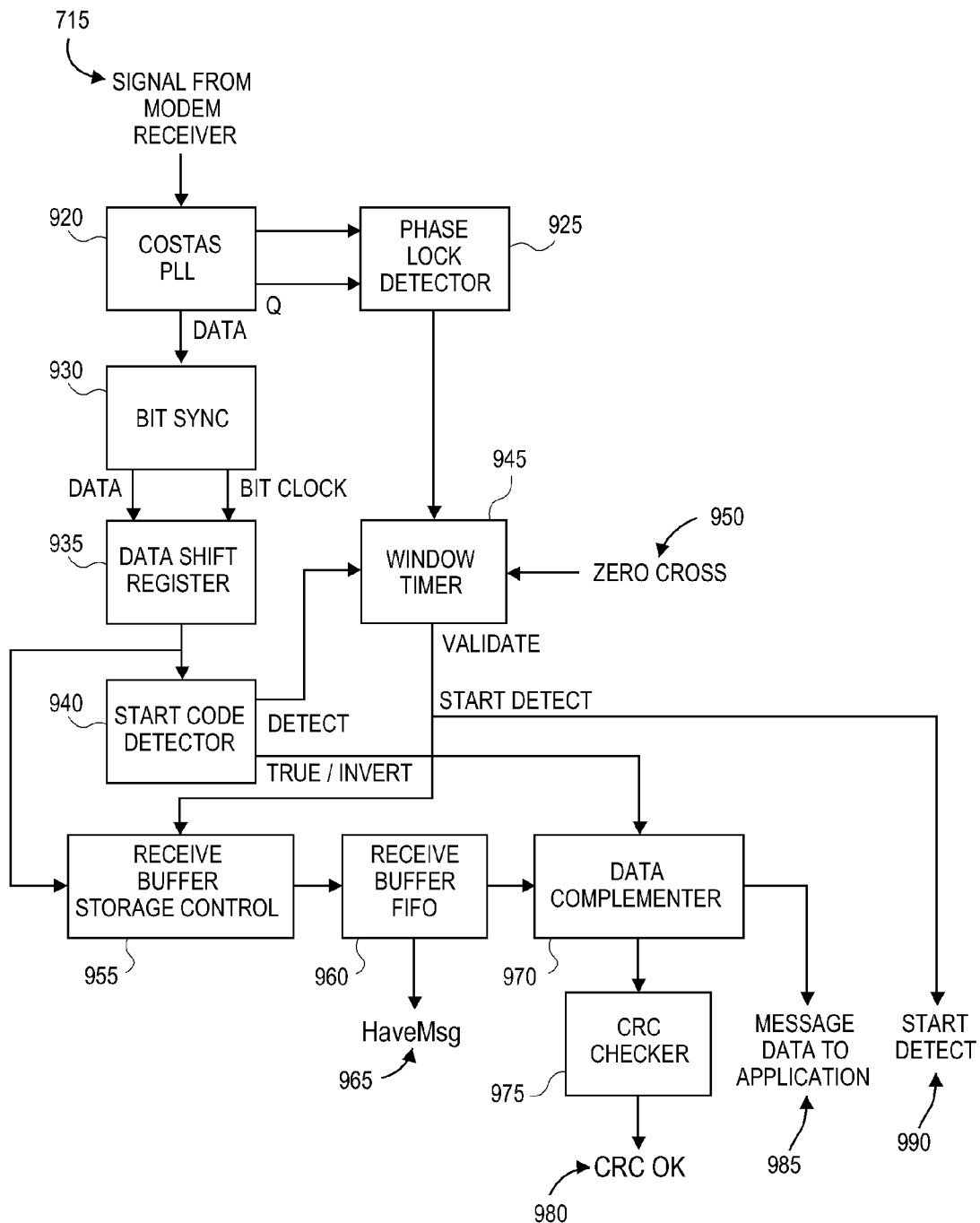
FIG. 9 is a block diagram illustrating the overall flow of information related to receiving messages from the powerline, according to certain embodiments.

FIG. 9 shows message receiver 720 of FIG. 7 in greater detail and illustrates the device 220 receiving a message from the powerline. The modem receive circuitry 715 of FIG. 7 conditions the signal on the powerline and transforms it into a digital data stream that the firmware in FIG. 9 processes to retrieve messages. Raw data from the powerline is typically very noisy, because the received signal amplitude can be as low as only few millivolts, and the powerline often carries high-energy noise spikes or other noise of its own. Therefore, in an embodiment, a Costas phase-locked-loop (PLL) 920, implemented in firmware, is used to find the PSK signal within the noise. Costas PLLs, well known in the art, phase-lock to a signal both in phase and in quadrature. A phase-lock detector 925 provides one input to a window timer 945, which also receives a zero crossing signal 950 and an indication that a start code in a packet has been found by start code detector 940.

Whether it is phase-locked or not, the Costas PLL 920 sends data to the bit sync detector 930. When the sync bits of alternating ones and zeros at the beginning of a packet arrive, the bit sync detector 930 will be able to recover a bit clock, which it uses to shift data into data shift register 935. The start code detector 940 looks for the start code following the sync bits and outputs a detect signal to the window timer 945 after it has found one. The window timer 945 determines that a valid packet is being received when the data stream begins approximately 800 microseconds before the powerline zero crossing, the phase lock detector 925 indicates lock, and detector 940 has found a valid start code. At that point the window timer 945 sets a start detect flag 990 and enables the receive buffer controller 955 to begin accumulating packet data from shift register 935 into the FIFO receive buffer 960. The storage controller 955 insures that the FIFO 960 builds up the data bytes in a message, and not sync bits or start codes. It stores the correct number of bytes, 10 for a standard message and 24 for an extended message, for example, by inspecting the Extended Message bit in the Message Flags byte. When the correct number of bytes has been accumulated, a HaveMsg flag 965 is set to indicate a message has been received.

Costas PLLs have a phase ambiguity of 180 degrees, since they can lock to a signal equally well in phase or anti-phase. Therefore, the detected data from PLL 920 may be inverted from its true sense. The start code detector 940 resolves the ambiguity by looking for the true start code, C3 hexadecimal, and also its complement, 3C hexadecimal. If it finds the complement, the PLL is locked in antiphase and the data bits are inverted. A signal from the start code detector 940 tells the data complementer 970 whether to un-invert the data or not. The CRC checker 975 computes a CRC on the received data and compares it to the CRC in the received message. If they match, the CRC OK flag 980 is set.

Data from the complementer 970 flows into an application buffer, not shown, via path 985. The application will have received a valid message when the HaveMsg flag 965 and the CRC OK flag 980 are both set.

Figure 10:
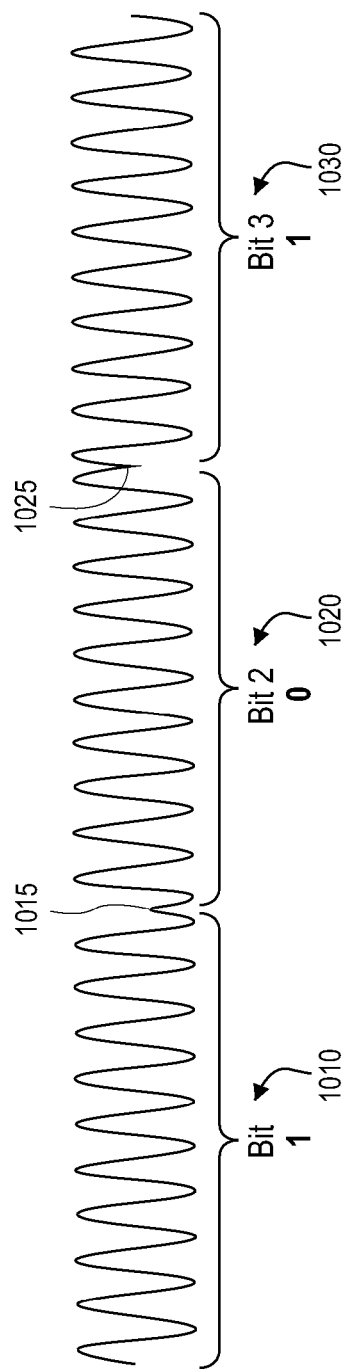
FIG. 10 illustrates a powerline signal, according to certain embodiments.

FIG. 10 illustrates an exemplary 131.65 kHz powerline carrier signal with alternating BPSK bit modulation. Each bit uses ten cycles of carrier. Bit 1010, interpreted as a one, begins with a positive-going carrier cycle. Bit 2 1020, interpreted as a zero, begins with a negative-going carrier cycle. Bit 3 1030, begins with a positive-going carrier cycle, so it is interpreted as a one. Note that the sense of the bit interpretations is arbitrary. That is, ones and zeros could be reversed as long as the interpretation is consistent. Phase transitions only occur when a bitstream changes from a zero to a one or from a one to a zero. A one followed by another one, or a zero followed by another zero, will not cause a phase transition. This type of coding is known as NRZ or nonreturn to zero.

FIG. 10 shows abrupt phase transitions of 180 degrees at the bit boundaries 1015 and 1025. Abrupt phase transitions introduce troublesome high-frequency components into the signal's spectrum. Phase-locked detectors can have trouble tracking such a signal. To solve this problem, the powerline encoding process uses a gradual phase change to reduce the unwanted frequency components.

Figure 11:
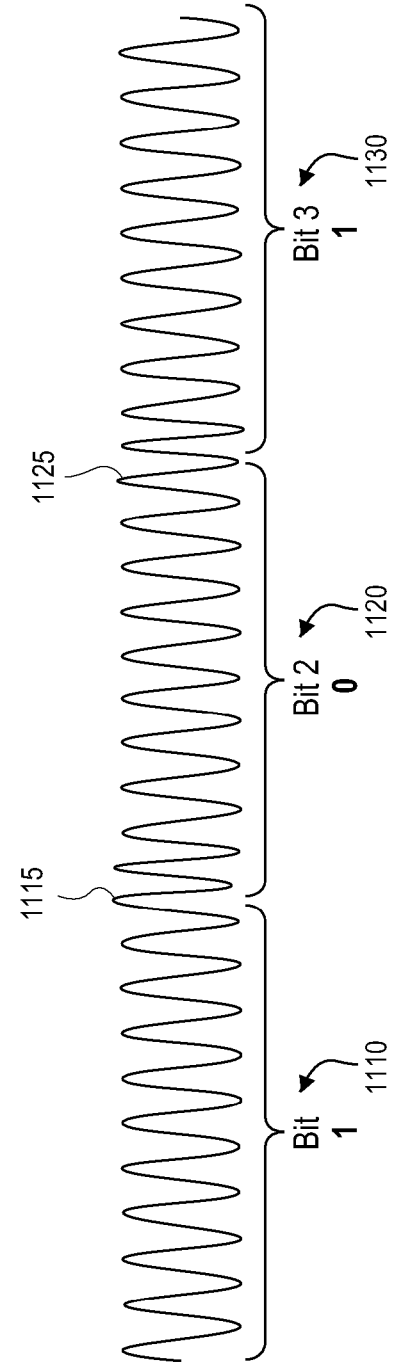
FIG. 11 illustrates a powerline signal with transition smoothing, according to certain embodiments.

FIG. 11 illustrates the powerline BPSK signal of FIG. 10 with gradual phase shifting of the transitions. The transmitter introduces the phase change by inserting approximately 1.5 cycles of carrier at 1.5 times the approximately 131.65 kHz frequency. Thus, in the time taken by one cycle of 131.65 kHz, three half-cycles of carrier will have occurred, so the phase of the carrier is reversed at the end of the period due to the odd number of half-cycles. Note the smooth transitions 1115 and 1125.

In an embodiment, the powerline packets comprise 24 bits. Since a bit takes ten cycles of 131.65 kHz carrier, there are 240 cycles of carrier in a packet, meaning that a packet lasts approximately 1.823 milliseconds. The powerline environment is notorious for uncontrolled noise, especially high-amplitude spikes caused by motors, dimmers and compact fluorescent lighting. This noise is minimal during the time that the current on the powerline reverses direction, a time known as the powerline zero crossing. Therefore, the packets are transmitted near the zero crossing.

Figure 12:
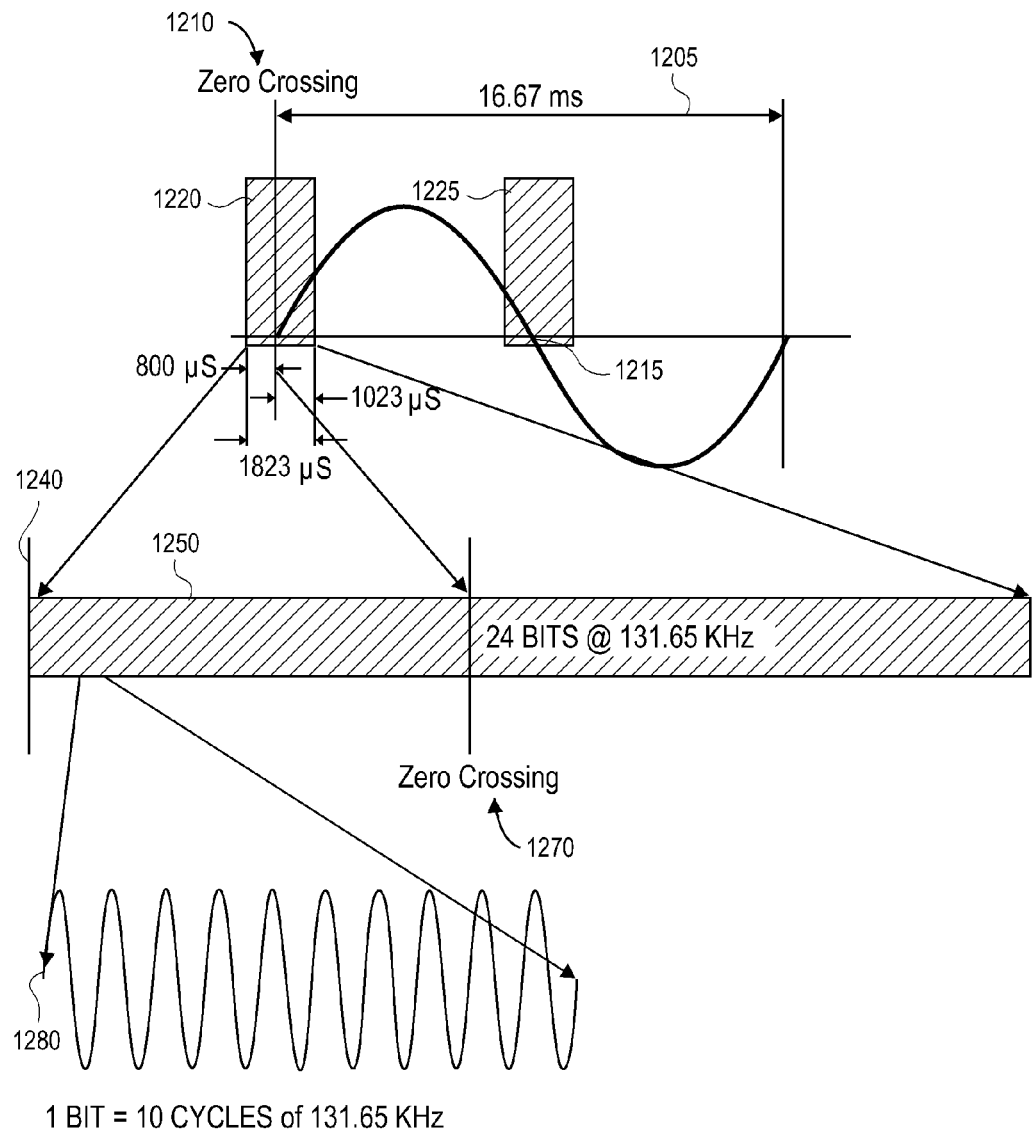
FIG. 12 illustrates powerline signaling applied to the powerline, according to certain embodiments.

FIG. 12 illustrates powerline signaling applied to the powerline. Powerline cycle 1205 possesses two zero crossings 1210 and 1215. A packet 1220 is at zero crossing 1210 and a second packet 1225 is at zero crossing 1215. In an embodiment, the packets 1220, 1225 begin approximately 800 microseconds before a zero crossing and last until approximately 1023 microseconds after the zero crossing.

In some embodiments, the powerline transmission process waits for one or two additional zero crossings after sending a message to allow time for potential RF retransmission of the message by devices 220.

Figure 13:
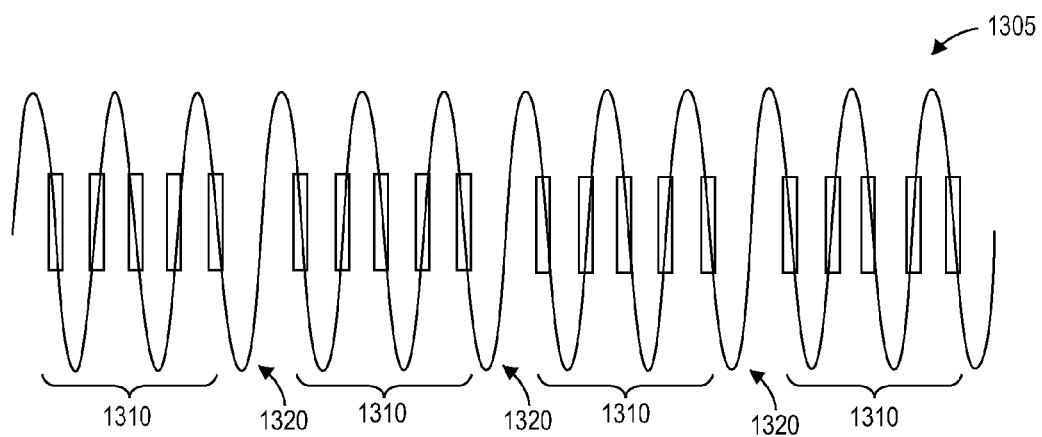
FIG. 13 illustrates standard message packets applied to the powerline, according to certain embodiments.
Figure 14:
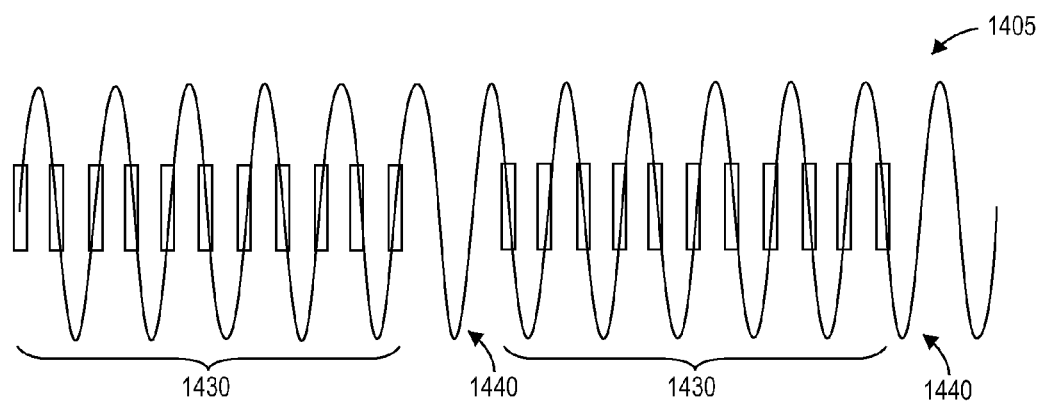
FIG. 14 illustrates extended message packets applied to the powerline, according to certain embodiments.

FIG. 13 illustrates an exemplary series of five-packet standard messages 1310 being sent on powerline signal 1305. In an embodiment, the powerline transmission process waits for at least one zero crossing 1320 after each standard message 1310 before sending another packet. FIG. 14 illustrates an exemplary series of eleven-packet extended messages 1430 being sent on the powerline signal 1405. In another embodiment, the powerline transmission process waits for at least two zero crossings 1440 after each extended message before sending another packet. In other embodiments, the powerline transmission process does not wait for extra zero crossings before sending another packet.

In some embodiments, standard messages contain 120 raw data bits and use six zero crossings, or approximately 50 milliseconds to send. In some embodiments, extended messages contain 264 raw data bits and use thirteen zero crossings, or approximately 108.33 milliseconds to send. Therefore, the actual raw bitrate is approximately 2,400 bits per second for standard messages 1310, and approximately 2,437 bits per second for extended messages 1430, instead of the 2880 bits per second the bitrate would be without waiting for the extra zero crossings 1320, 1440.

In some embodiments, standard messages contain 9 bytes (72 bits) of usable data, not counting packet sync and start code bytes, nor the message CRC byte. In some embodiments, extended messages contain 23 bytes (184 bits) of usable data using the same criteria. Therefore, the bitrates for usable data are further reduced to 1440 bits per second for standard messages 1310 and 1698 bits per second for extended messages 1430. Counting only the 14 bytes (112 bits) of User Data in extended messages, the User Data bitrate is 1034 bits per second.

The devices 220 can send and receive the same messages that appear on the powerline using radio frequency signaling. Unlike powerline messages, however, messages sent by radio frequency are not broken up into smaller packets sent at powerline zero crossings, but instead are sent whole. As with powerline, in an embodiment, there are two radio frequency message lengths: standard 10-byte messages and extended 24-byte messages.

Figure 15:
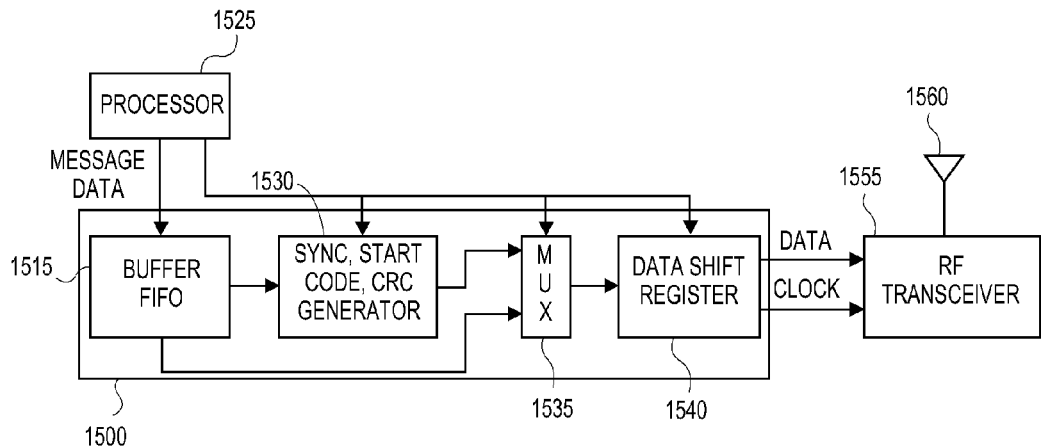
FIG. 15 is a block diagram illustrating the overall flow of information related to transmitting messages via RF, according to certain embodiments.

FIG. 15 is a block diagram illustrating message transmission using radio frequency (RF) signaling comprising processor 1525, RF transceiver 1555, antenna 1560, and RF transmit circuitry 1500. The RF transmit circuitry 1500 comprises a buffer FIFO 1525, a generator 1530, a multiplexer 1535, and a data shift register 1540.

The steps are similar to those for sending powerline messages in FIG. 8, except that radio frequency messages are sent all at once in a single packet. In FIG. 15, the processor 1525 composes a message to send, excluding the CRC byte, and stores the message data into the transmit buffer 1515. The processor 1525 uses the multiplexer 1535 to add sync bits and a start code from the generator 1530 at the beginning of the radio frequency message followed by data shifted out of the first-in first-out (FIFO) transmit buffer 1515.

As the message data is shifted out of FIFO 1515, the CRC generator 1530 calculates the CRC byte, which is appended to the bitstream by the multiplexer 1535 as the last byte of the message. The bitstream is buffered in the shift register 1540 and clocked out to the RF transceiver 1555. The RF transceiver 1555 generates an RF carrier, translates the bits in the message into Manchester-encoded symbols, frequency modulates the carrier with the symbol stream, and transmits the resulting RF signal using antenna 1560. In an embodiment, the RF transceiver 1555 is a single-chip hardware device and the other steps in FIG. 15 are implemented in firmware running on the processor 1525.

Figure 16:
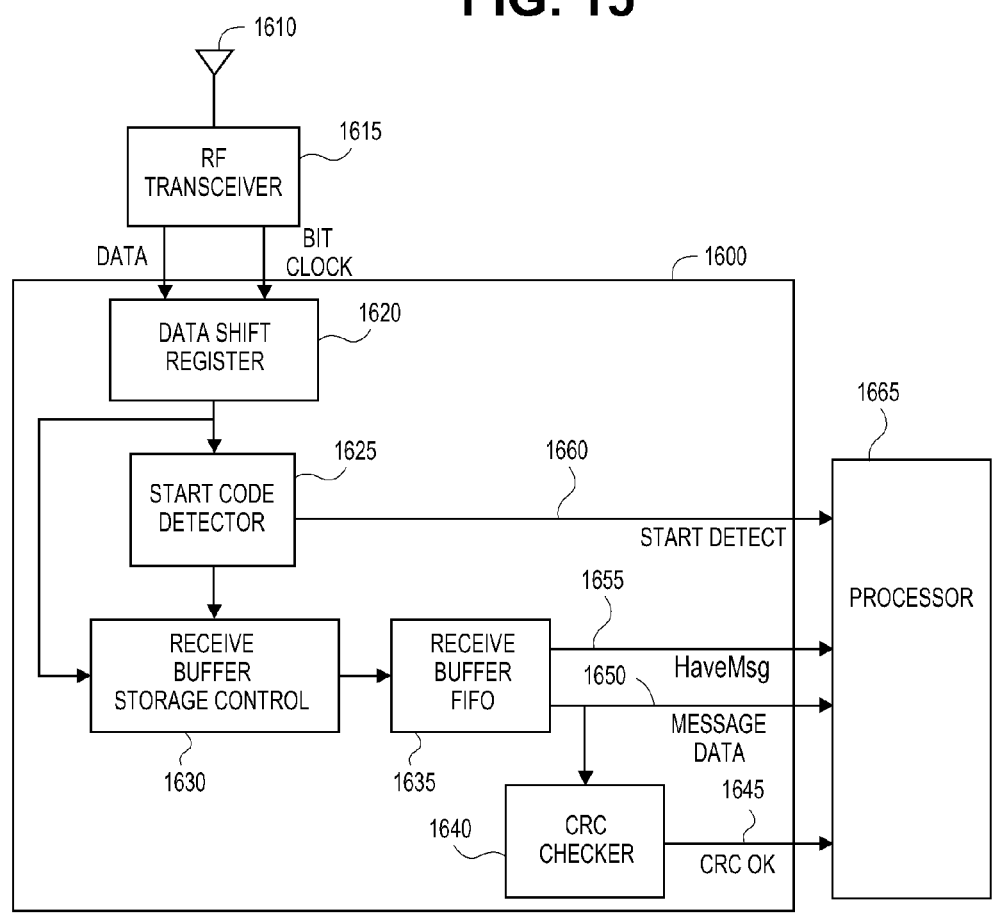
FIG. 16 is a block diagram illustrating the overall flow of information related to receiving messages via RF, according to certain embodiments.

FIG. 16 is a block diagram illustrating message reception using the radio frequency signaling comprising processor 1665, RF transceiver 1615, antenna 1610, and RF receive circuitry 1600. The RF receive circuitry 1600 comprises a shift register 1620, a code detector 1625, a receive buffer storage controller 1630, a buffer FIFO 1635, and a CRC checker 1640.

The steps are similar to those for receiving powerline messages given in FIG. 9, except that radio frequency messages are sent all at once in a single packet. In FIG. 16, the RF transceiver 1615 receives an RF transmission from antenna 1610 and frequency demodulates it to recover the baseband Manchester symbols. The sync bits at the beginning of the message allow the transceiver 1615 to recover a bit clock, which it uses to recover the data bits from the Manchester symbols. The transceiver 1615 outputs the bit clock and the recovered data bits to shift register 1620, which accumulates the bitstream in the message.

The start code detector 1625 looks for the start code following the sync bits at the beginning of the message and outputs a detect signal 1660 to the processor 1665 after it has found one. The start detect flag 1660 enables the receive buffer controller 1630 to begin accumulating message data from shift register 1620 into the FIFO receive buffer 1635. The storage controller 1630 insures that the FIFO receive buffer 1635 stores the data bytes in a message, and not the sync bits or start code. In an embodiment, the storage controller 1630 stores 10 bytes for a standard message and 24 for an extended message, by inspecting the Extended Message bit in the Message Flags byte.

When the correct number of bytes has been accumulated, a HaveMsg flag 1655 is set to indicate a message has been received. The CRC checker 1640 computes a CRC on the received data and compares it to the CRC in the received message. If they match, the CRC OK flag 1645 is set. When the HaveMsg flag 1655 and the CRC OK flag 1645 are both set, the message data is ready to be sent to processor 1665. In an embodiment, the RF transceiver 1615 is a single-chip hardware device and the other steps in FIG. 16 are implemented in firmware running on the processor 1665.

FIG. 17 is a table 1700 of exemplary specifications for RF signaling within the communication network 200. In an embodiment, the center frequency lies in the band of approximately 902 to 924 MHz, which is permitted for non-licensed operation in the United States. In certain embodiments, the center frequency is approximately 915 MHz. Each bit is Manchester encoded, meaning that two symbols are sent for each bit. A one-symbol followed by a zero-symbol designates a one-bit, and a zero-symbol followed by a one-symbol designates a zero-bit.

Symbols are modulated onto the carrier using frequency-shift keying (FSK), where a zero-symbol modulates the carrier by half of the FSK deviation frequency downward and a one-symbol modulates the carrier by half of the FSK deviation frequency upward. The FSK deviation frequency is approximately 64 kHz. In other embodiments, the FSK deviation frequency is between approximately 100 kHz and 200 kHz. In other embodiments the FSK deviation frequency is less than 64 kHz. In further embodiment, the FSK deviation frequency is greater than 200 kHz. Symbols are modulated onto the carrier at approximately 38,400 symbols per second, resulting in a raw data rate of half that, or 19,200 bits per second. The typical range for free-space reception is 150 feet, which is reduced in the presence of walls and other RF energy absorbers.

In other embodiments, other encoding schemes, such as return to zero (RZ), Nonreturn to Zero-Level (NRZ-L), Nonreturn to Zero Inverted (NRZI), Bipolar Alternate Mark Inversion (AMI), Pseudoternary, differential Manchester, Amplitude Shift Keying (ASK), Phase Shift Keying (PSK, BPSK, QPSK), and the like, could be used.

Devices transmit data with the most-significant bit sent first. In an embodiment, RF messages begin with two sync bytes comprising AAAA in hexadecimal, followed by a start code byte of C3 in hexadecimal. Ten data bytes follow in standard messages, or twenty-four data bytes in extended messages. The last data byte in a message is a CRC over the data bytes as disclosed above.

Local Receiver

The local receiver 1800 is configured to communicate with the local controller 2000 and to communicate with the network 200. Unlike the network devices 220, the local receiver 1800 does not have powerline communication capabilities and does not operate on the powerline. Similar to the network devices 220, the local receiver 1800 transmits messages to and receives messages from the network 200. However, unlike the network devices 220, the local receiver 1800 does not operate as a repeater.

The low power receiver 1800 spends the majority of its time asleep in order to conserve power. In an embodiment, the wake-up duty cycle is programmable, depending upon the desired application of the low power receiver 1800. The wake-up interval can range from approximately 100 msec or less to approximately once a day.

Figure 18:
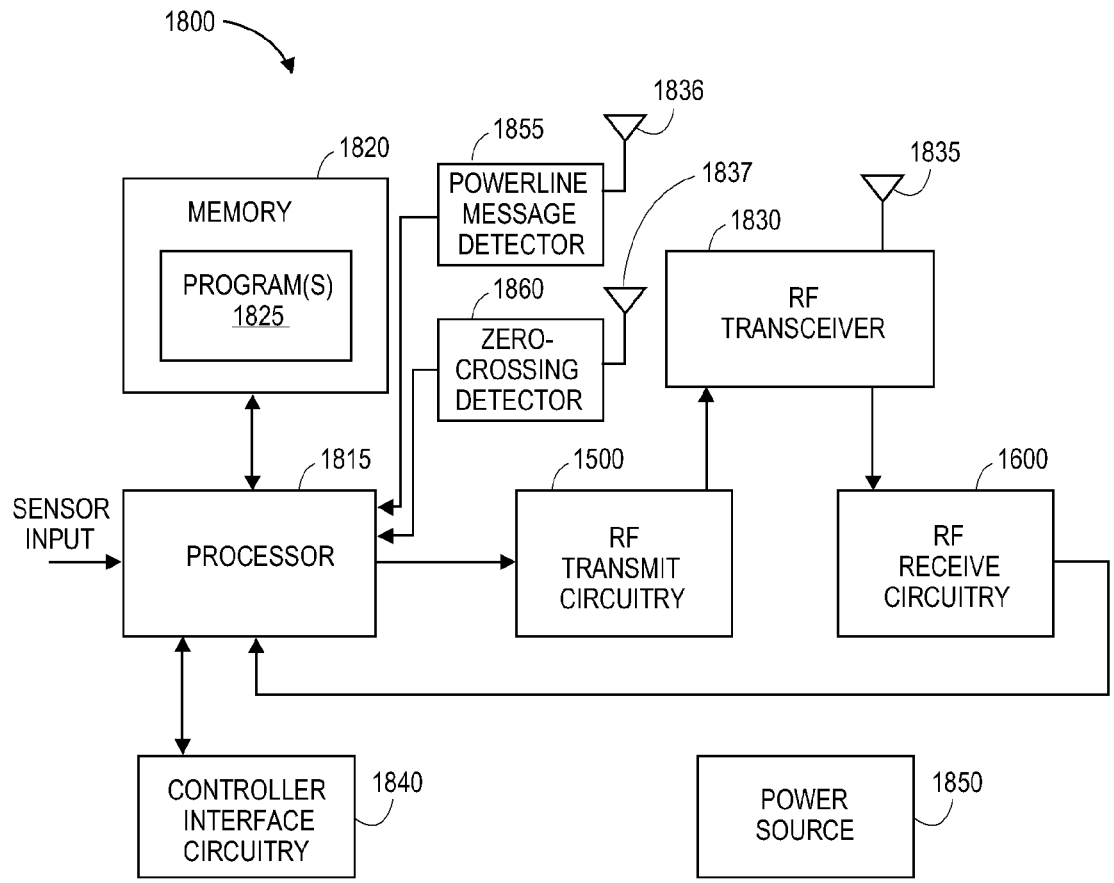
FIG. 18 is block diagram illustrating a local receiver, according to certain embodiments.

FIG. 18 illustrates an embodiment of the local receiver 1800 comprising a processor 1815, memory 1820, an RF transceiver 1830, an antenna 1835, controller interface circuitry 1840, a power source 1850, the RF transmit circuitry 1500 as described above in FIG. 15, and the RF receive circuitry 1600 as described above in FIG. 16. The local receiver 1800 further comprises a powerline message detector 1855, an antenna 1836 associated with powerline message detector, a zero crossing detector 1860, and an antenna 1837 associated with the zero crossing detector 1860. In an embodiment, the local receiver 1800 comprises a low-power receiver.

Processor

The processor circuitry 1815 provides program logic and memory 1820 in support of programs 1825 and intelligence within the local receiver 1800. In an embodiment, the processor circuitry 1815 comprises a computer and the associated memory 1820. The computers comprise, by way of example, processors, program logic, or other substrate configurations representing data and instructions, which operate as described herein. In other embodiments, the processors can comprise controller circuitry, processor circuitry, processors, general purpose single-chip or multi-chip microprocessors, digital signal processors, embedded microprocessors, microcontrollers and the like.

The memory 1820 can comprise one or more logical and/or physical data storage systems for storing data and applications used by the processor 1815 and the program logic 1825. The program logic 1825 may advantageously be implemented as one or more modules. The modules may advantageously be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, or variables.

In an embodiment, the processor 1815 executes the programs or rule sets 1825 stored in the memory 1820 to process messages. The RF communications circuits 1500, 1600 use narrow band frequency shift keying (FSK) communications. The processor 1815 receives data from the local controller 2000 via the controller interface circuitry 1840. In an embodiment, the data from the local controller 2000 comprises a serial bit stream. The processor 1815 composes a message based at least in part on the data received from the local controller 2000. The processor 1815 sends the message to the RF transmit circuitry 1500, where the message is encoded using FSK onto a baseband signal, which is up converted and transmitted from antenna 1835 to other devices 220 on the network 200.

In addition, the antenna 1835 receives RF signals from at least one device 220 on the network 200 which are down converted to a baseband FSK encoded signal and decoded by the RF receive circuitry 1600. The processor circuitry 1815 receives and processes the decoded message into commands and/or data for the local controller 2000. The processor 1815 send commands and/or data to the local controller 2000 via the controller interface circuitry 1840. In an embodiment, the commands and/or data to the local controller 2000 comprises a serial bit stream.

In other embodiments, the programming 1825 may include processes to conserve power consumed by the low power receiver 1800. Such processes may periodically cause the processor 1815 to check for messages from the network 200 that are addressed to it and/or to check for messages or data from the local controller 2000. In an embodiment, the processor 1815 receives one or more inputs, such as interrupts or the like, from one or more sensors, such as a motion sensor, a touch keypad, or the like.

Radio Frequency (RF) Communications

In an embodiment, the RF transmit circuitry 1500 comprises the buffer FIFO 1525, the generator 1530, the multiplexer 1535, and the data shift register 1540, as describe above with respect to FIG. 15, and the RF receive circuitry 1600 comprises the shift register 1620, the code detector 1625, the receive buffer storage controller 1630, the buffer FIFO 1635, and the CRC checker 1640, as described above with respect to FIG. 16.

Similar to the operation described above in FIG. 15, the processor 1815 composes a message to send, excluding the CRC byte, and stores the message data into the transmit buffer 1515. The processor 1815 uses the multiplexer 1535 to add sync bits and a start code from the generator 1530 at the beginning of the radio frequency message followed by data shifted out of the first-in first-out (FIFO) transmit buffer 1515. As the message data is shifted out of FIFO 1515, the CRC generator 1530 calculates the CRC byte, which is appended to the bitstream by the multiplexer 1535 as the last byte of the message. The bitstream is buffered in the shift register 1540 and clocked out to the RF transceiver 1555. The RF transceiver 1555 generates an RF carrier, translates the bits in the message into Manchester-encoded symbols, FM modulates the carrier with the symbol stream, and transmits the resulting RF signal using antenna 1835. In an embodiment, the FM carrier is approximately 915 MHz.

Similar to the operation described above in FIG. 16, the RF transceiver 1615 receives an RF transmission from antenna 1835, which is tuned to approximately 915 MHz, and FM demodulates it to recover the baseband Manchester symbols. The sync bits at the beginning of the message allow the transceiver 1615 to recover a bit clock, which it uses to recover the data bits from the Manchester symbols. The transceiver 1615 outputs the bit clock and the recovered data bits to shift register 1620, which accumulates the bitstream in the message. The start code detector 1625 looks for the start code following the sync bits at the beginning of the message and outputs a detect signal 1660 to the processor 1665 after it has found one.

The start detect flag 1660 enables the receive buffer controller 1630 to begin accumulating message data from shift register 1620 into the FIFO receive buffer 1635. The storage controller 1630 insures that the FIFO 1635 stores the data bytes in a message, and not the sync bits or start code. The storage controller 1630 stores 10 bytes for a standard message and 24 for an extended message, by inspecting the Extended Message bit in the Message Flags byte. When the correct number of bytes has been accumulated, a HaveMsg flag 1655 is set to indicate a message has been received. The CRC checker 1640 computes a CRC on the received data and compares it to the CRC in the received message. If they match, the CRC OK flag 1645 is set. When the HaveMsg flag 1655 and the CRC OK flag 1645 are both set, the message data is ready to be sent to processor 1815.

Powerline Message Detection

The powerline message detector 1855 and associated antenna 1836 are configured to detect activity on the powerline, and based on the activity on the powerline, the local receiver 1800 checks for network messages. In an embodiment, the local receiver 1800 "sleeps" most of the time to conserve power and "wakes up" when there is message activity on the powerline. Once the local receiver 1800 is alerted to message activity, it checks for messages addressed to it. If there are no messages addressed to it, the local receiver 1800 goes back to the power conserving mode.

As described above, network messages are sent over the powerline by modulating the data onto a carrier signal which is added to the powerline signal. The carrier signal generates an electromagnetic field which can be detected by a tuned antenna. In an embodiment, the carrier signal is approximately 131.65 kHz and the antenna 1836 is tuned to approximately 131.65 kHz±2%. In other embodiments, the antenna 1836 is tuned to approximately the same frequency as the carrier signal. In further embodiments, the antenna 1836 is tuned to approximately 131.65 kHz±0.05%. In other embodiments, the percentage deviation ranges between ±0.01% to ±5%. When the antenna 1836 detects the electromagnetic field generated by the carrier signal in the powerline messages, the powerline message detector 1855 alerts the local receiver 1800 to check for network messages. In an embodiment, the powerline message detector 1855 sends an interrupt to the processor 1815 when the antenna 1836 detects the carrier signal.

Zero Crossing Detection

The zero crossing detector 1860 and associated antenna 1837 are configured to detect the zero crossing of the powerline, and based on the zero crossing, the local receiver 1800 synchronizes with the network 200 to send messages to the hub 250 via the network 200 at the appropriate time. Common examples of the powerline voltage are nominally 110 VAC alternating at 60 Hz, nominally 230 VAC alternating at 50 Hz, and the like. In an embodiment, the antenna 1837 is tuned to approximately 60 Hz±approximately 20 Hz. In another embodiment, the antenna 1837 is turned to approximately 50 Hz±approximately 20 Hz. In a further embodiment, the antenna 1837 is tuned to between approximately 40 Hz and approximately 100 Hz. In these cases, the antenna 1837 detects the presence of the electromagnetic field generated by the alternating of the powerline voltage. The zero crossing detector 1860 identifies the powerline zero crossing based on the input from the antenna 1837 and alerts the local receiver 1800. In an embodiment, the zero crossing detector 1860 sends an interrupt to the processor 1815 when the antenna 1837 detects the frequency of the alternating current of the powerline.

Controller Interface Circuitry

In an embodiment, the local controller 2000 sends an interrupt to the processor circuitry 1815 via the controller interface circuitry 1840 to indicate that there is data from the local controller 2000 to send to the hub 250. The local receiver 1800 receives the data over a serial communication bus from the local controller 2000. In another embodiment, the local receiver 1800 sends an interrupt to the local controller 2000 via the controller interface circuitry 1840 to indicate that there is a message from the hub 250 for the local controller 2000. In an embodiment, the local receiver 1800 and the local controller 2000 communicate using logic level serial communications, such as, for example, Inter-Integrated Circuit ($I^2C$), Serial Peripheral Interface (SPI) Bus, an asynchronous bus, and the like.

Power Source

In an embodiment, the power source 1850 comprises a battery and a regulator to regulate the battery voltage to approximately 5 volts to power the circuitry 1815, 1820, 1830, 1840, 1500, 1600. As described above, the local receiver 1800 spends the majority of its time asleep in order to conserve power and the wake-up duty cycle can be programmable. The amount of time the local receiver 1800 spends asleep versus the amount of time it operates affects the power source 1850. For example, some applications of the low power receiver 1800 require faster response times and as a result, these low power receivers 1800 comprise a higher capacity power source 1850, such as a larger battery, or more frequent power source replacement. In another example, other applications of the low power receiver 1800 have much less frequent response times and have a very long power source life.

In an embodiment, the battery comprises an approximately 1 ampere-hour battery. In other embodiments, the battery capacity is greater than 1 ampere-hour or less than 1 ampere-hour. Embodiments of the battery can be rechargeable or disposable. In other embodiments, the power source 1850 comprises other low voltage sources, AC/DC converters, photovoltaic cells, electro-mechanical batteries, standard on-time use batteries, and the like.

Figure 19A:
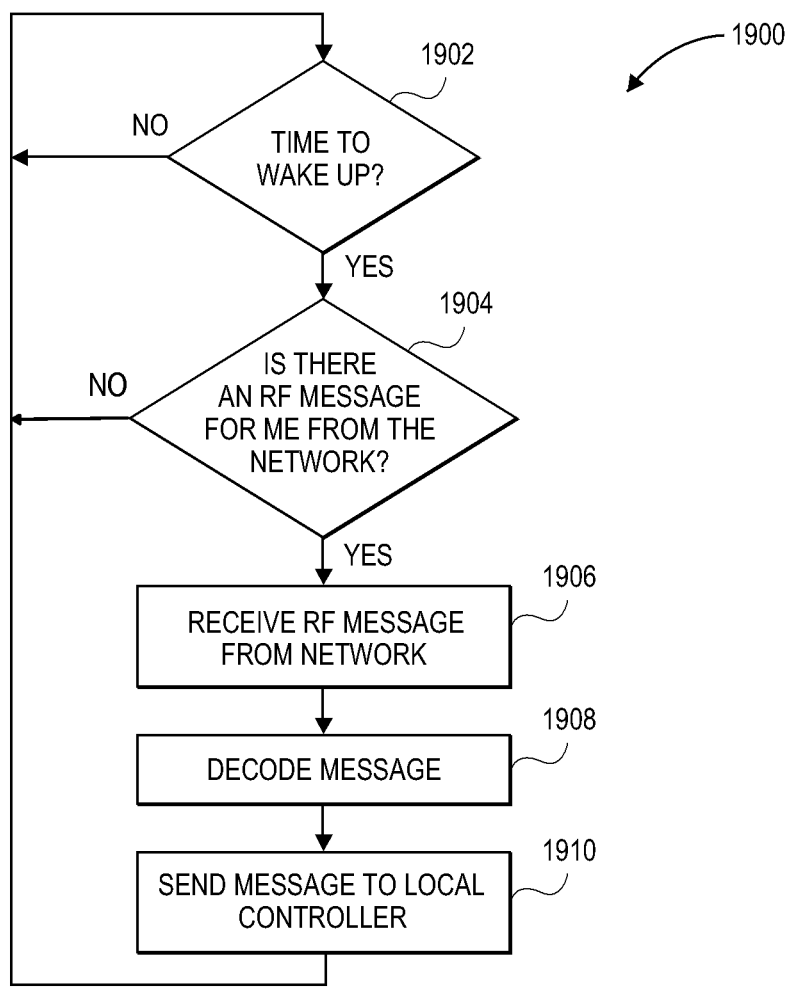
FIG. 19A illustrates a process used by the local receiver to receive messages from the network and send messages to the local controller, according to certain embodiments.

FIG. 19A illustrates a process 1900 used by the local receiver to send messages from the network 200 to the local controller 2000. In order to conserve power, the local receiver 1800 spends the majority of the time asleep or in a low power mode and periodically checks for messages addressed to it. At step 1902, the local receiver 1800 waits in a low-power or sleep mode until the process 1900 determines that it is time to wake-up the local receiver 1800. If it is not time to wake-up the processor 1815, the process 1900 returns to step 1902.

In an embodiment, the sleep interval or in other words, the wake-up duty cycle, is user programmable and the user can choose from several embodiments to wake-up the local receiver 1800.

For example, in one embodiment, the process 1900 alerts the local receiver 1800 to the occurrence of the powerline or AC sine wave zero-crossing. The antenna 1837 detects the electromagnetic field generated by the alternating current of the powerline and the zero-crossing detector 1860 alerts the processor 1815 to the zero-crossings. The local receiver 1800 or the zero-crossing detector 1860 can further comprise a counter to count to a user programmable number of detected zero-crossings before sending the interrupt to the processor 1815. The counter can be implemented in the programming 1825 or can be implemented as hardware. For example, for a 60 Hz alternating current power signal, the processor 1815 could be interrupted at each zero-crossing which is approximately 120 times per second. A counter implemented to count to 432,000, for example, would generate an interrupt approximately one per hour. In other embodiments, a counter could be implemented to generate an interrupt once a day, more often than once a day, or less often than once a day, based on the count of the detected zero crossings of the AC powerline.

In another embodiment, the process 1900 alerts the local receiver 1800 to the presence of message traffic on the powerline. The antenna 1836 detects the presence of the powerline signal carrier that radiates into free space. In an embodiment, the powerline message detector 1855 sends an interrupt to the processor 1815 when the antenna 1836 detects the electromagnetic field generated by the carrier signal. The interrupt wakes-up the processor 1815.

In a further embodiment, the process 1900 alerts the local receiver 1800 to the presence of message traffic on the powerline and wakes-up the processor 1815 for approximately 800 msec before the zero-crossing, when the powerline messages are sent. As described above, the powerline message detector 1855 and the antenna 1836 detect the RF carrier signal and the zero-crossing detector 1860 and the antenna 1837 detect the zero-crossing of the AC powerline. The local receiver 1800 further comprises a gating function to gate the indication of the powerline message activity and the indication of the powerline zero-crossing to provide the interrupt to the processor 1815. The interrupt wakes-up the local receiver 1800 at the INSTEON® message time which is approximately 800 msec before the powerline zero-crossing.

In another embodiment, the processor 1815 receives an interrupt from a sensor when the sensor is activated. The interrupt wakes-up the processor 1815. Examples of sensors are a motion sensor, a touch key pad, a proximity sensor, a temperature sensor, an acoustic sensor, a moisture sensor, a light sensor, a pressure sensor, a tactile sensor, a barometer, an alarm sensor, and the like.

In yet another embodiment, the local receiver 1800 comprises a software timer implemented in the programming 1825. The process 1900 checks the status of the timer. In an embodiment, the process 1900 wakes up the local receiver 1800 approximately every 100 msec to check for messages from the network 200. In another embodiment, the process 1900 wakes up the local receiver 1800 between approximately 100 msec and approximately 1000 msec to check for messages. In a further embodiment, the wake-up interval can range from 100 msec and below to approximately once per day.

At step 1904, the local receiver 1800 has woken up, and the process 1900 checks if there is at least one RF message from the network 200 that comprises the address of the local receiver 1800. In an embodiment, the RF transceiver 1830 receives the RF signals through the antenna 1837. In an embodiment, the processor 1815 checks the RF receive circuitry 1600 for received messages. If there is not a message addressed to the local receiver 1800, the process 1900 returns to step 1902.

If there is a message addressed to the local receiver 1800, the process 1900 moves to step 1906. At step 1906, the process 1900 receives the RF message from the network 200. In an embodiment, the processor 1815 receives the message from the RF receive circuitry 1600. And at step 1908, the process 1900 decodes the message. In an embodiment, the receiver 1600 demodulates the RF message and sends the message data to the processor 1815.

At step 1910, the process 1900 sends the information decoded from the received RF message to the local controller 2000 to be processed. In an embodiment, the processor 1815 formats the decoded information as a serial bit stream and sends the serial bit stream via the controller interface circuitry 1840 to the local controller 2000. In an embodiment, the information comprises at least one command and the local controller 2000 performs the command.

Figure 19B:
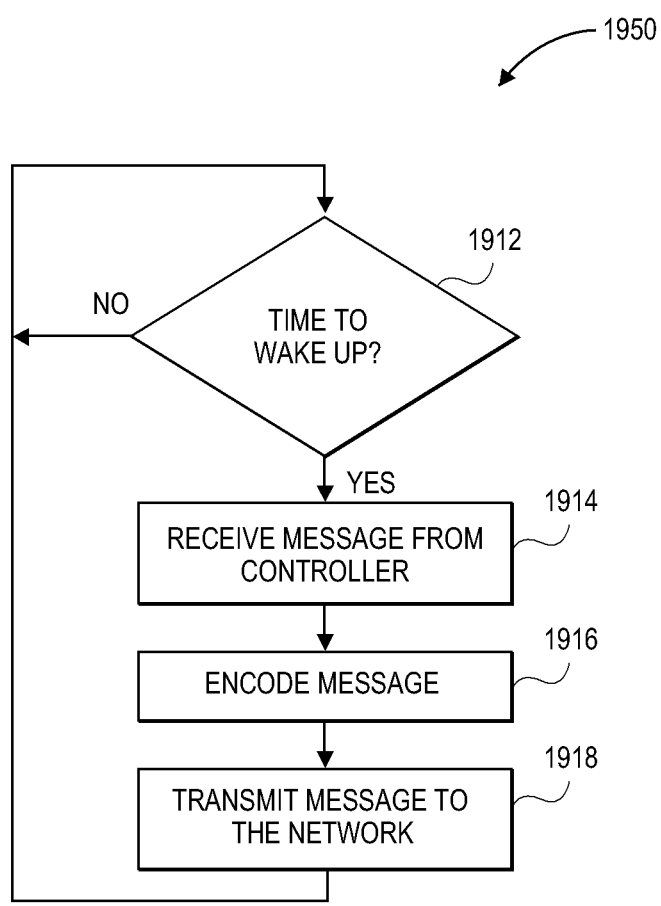
FIG. 19B illustrates a process used by the local receiver to receive messages from the local controller and send messages to the network, according to certain embodiments.

FIG. 19B illustrates a process 1950 used by the local receiver 1800 to send messages from the local controller 2000 to the network 200. In order to conserve power, the local receiver 1800 spends the majority of the time asleep or in a low power mode and waits for data from the local controller 2000. At step 1912, the local receiver 1800 waits in a low-power or sleep mode until the process 1900 determines that it is time to wake-up the local receiver 1800.

In one embodiment, step 1912 is the same as step 1902 in FIG. 19A. After the process 1900 sends a message to the local controller 2000 at step 1910, or concurrent with steps 1904-1910, the process 1950 moves to step 1914 in FIG. 19B and checks for at least one message from the local controller 2000. If there is no message from the local controller 2000, the process 1950 returns to step 1912.

In another embodiment, at step 1912, the processor 1815 waits for an interrupt from the local controller 2000 via the controller interface circuitry 1840. If there is no interrupt, the process 1950 returns to step 1912. The interrupt indicates that the local controller 2000 has a message to send to the hub 250 via the network 200 and the local receiver 1800.

At step 1914, the process 1950 receives the message from the local controller 2000. In an embodiment, the processor 1815 receives the message from the controller interface circuitry 1840. In an embodiment, the message comprises serial data.

And at step 1916, the process 1950 encodes the data from the controller 2000 for RF transmission to the network 200. In an embodiment, the processor 1815 receives the serial data from the controller interface circuitry 1840 and formats the serial data into messages. In an embodiment, the RF transmit circuitry 1500 modulates the message onto the RF signal.

At step 1918, the process 1950 transmits the modulated RF signal to the network 200. In an embodiment, the antenna 1837 detects the electromagnetic field generated by the powerline alternating current and the zero crossing detector 1860 determines the zero crossings of the powerline. Detecting the zero crossing time of the powerline provides the local receiver 1800 with the ability to synchronize to the message traffic on the powerline. The zero crossing detector 1860 sends the information relating to the zero crossings of the powerline to the processor 1815. In an embodiment, the transmitter 1500 transmits the modulated RF signal to the network 200 based at least in part on the zero crossing times of the powerline. In an embodiment, the RF transceiver 1830 transmits the modulated RF signal through the antenna 1835 to the network 200.

Local Controller

Figure 20:
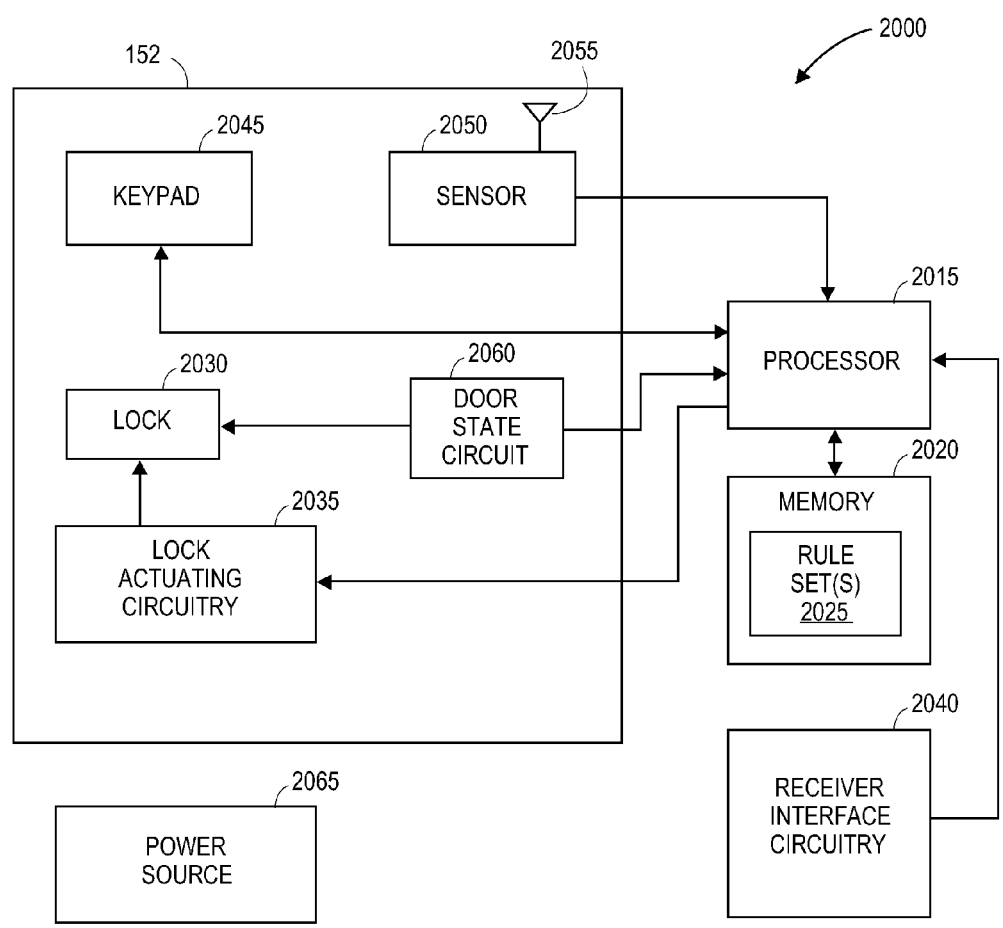
FIG. 20 is a block diagram illustrating a door lock controller, according to certain embodiments.

FIG. 20 is a block diagram illustrating the door lock controller 2000 comprising the door lock circuitry 152, receiver interface circuitry 2040, a processor 2015 and associated memory 2020, and a power source 2065.

Processor

The processor circuitry 2015 provides program logic and memory 2020 in support of programs 2025 and intelligence within the local controller 2000. Further, the processor 2015 formats data to send to the local receiver 1800 and receives commands and/or data from the local receiver 1800.

In an embodiment, the processor circuitry 2015 comprises a computer and the associated memory 2020. The computers comprise, by way of example, processors, program logic, or other substrate configurations representing data and instructions, which operate as described herein. In other embodiments, the processors can comprise controller circuitry, processor circuitry, processors, general purpose single-chip or multi-chip microprocessors, digital signal processors, embedded microprocessors, microcontrollers and the like.

The memory 2020 can comprise one or more logical and/or physical data storage systems for storing data and applications used by the processor 2015 and the program logic 2025. The program logic 2025 may advantageously be implemented as one or more modules. The modules may advantageously be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, or variables.

In an embodiment, the local receiver 1800 comprises the local controller 2000, such that the processor 1815 comprises the processor 2015 and the memory 1820 comprises the memory 2020.

Door Lock Circuitry

In an embodiment, the door lock circuitry 152 comprises a lock 2030, lock actuating circuitry 2035, door state circuitry 2060, a keypad 2045, and one or more sensors 2050. The sensors 2050 alert the processor 2015 to the presence of an electronic key, a person desiring entry through the door, a cell phone near the door, a user or a user's cell phone that will soon be approaching the door, and the like. Based at least in part on the sensor data, the processor 2015 determines whether to enable the keypad 2045. The keypad 2045 is configured to accept input from a user, typically a keycode entered by pushing numbered buttons in a specific sequence, to lock or unlock the door. The keypad 2045 communicates the user input data to the processor 2015.

The processor 2015 also receives commands and/or data from the local receiver 1800. Based at least in part on the received commands and/or data, the processor 2015 controls the lock actuating circuitry 2035 to lock or to unlock the door. The door state circuitry 2060 determines the state of the door (i.e. locked or unlocked) and communicates the state of the door to the processor 2015.

Sensors

The sensors 2050 comprise one or more sensors. In an embodiment, the sensor 2050 comprises a motion sensor, such as, for example, a pinhole motion detector, to detect the motion of an approaching person. In another embodiment, the sensor comprises a proximity switch, such as for example, a resistance touch switch, a capacitance touch switch, a piezo electric touch switch, and the like.

In another embodiment, the sensor 2050 comprises an RF envelope detector and an antenna 2055 to detect the presence of a cellphone. In a further embodiment, the sensor 2050 comprises a Bluetooth receiver and the antenna 2055 recognizes the mobile phone number of a cell phone within range of the receiver. In another embodiment, the sensor 2050 comprises a Wi-Fi (IEEE 802.11 standard) receiver and the antenna 2055 that recognizes a transmission through a local wireless local area network (WLAN). In a further embodiment, the sensor 2050 comprises a cellular modem and the antenna 2055 provides a wireless connection to a cellular carrier for data transfer. In a yet further embodiment, the sensor 2050 interfaces with a geolocation service to determine when an authorized user's cellphone is near the door.

In yet another embodiment, the sensor 2050 comprises image recognition device(s) and image recognition software to recognize an authorized user.

Keypad

The keypad 2045, in one embodiment, comprises a set of numbered buttons which are depressed in a particular sequence to enter the keycode.

Lock

The lock 2030 comprising a bolt and associated lock actuating circuitry 2035 are configured to lock and unlock a door. For example, the lock actuating circuitry 2035 comprises at least one motor that extends or retracts the bolt to lock or unlock the door. In an embodiment, the lock 2030 comprises the lock actuating circuitry 2035.

Door State Circuitry

The door state circuitry 2060 determines the state of the door and sends a signal to the door controller 2000 indicating whether the lock has locked or unlocked the door. For example, after an authorized user is determined, the hub 250 may send a command to the door controller 2000 to unlock the door. The door controller 2000 activates the motor controlling the lock, but the motor may fail to move the bolt and the door remains locked. The door state circuitry 2060 sends a signal indicating that the bolt is still making contact, such as electrical contact, magnetic contact, mechanical contact, or the like, with a sensor or switch in the door jamb and the door remains locked. In another example, the door controller 2000 may receive a command to activate the motor controlling the lock in order to lock the door. But the door is ajar, and the extended bolt does not extend within the door jamb, such that the door remains unlocked. The door state circuitry 2060 sends a signal to the hub 250 via the door controller 2000, local receiver 1800, and network 200 indicating that the bolt is not within the door jamb and the door is unlocked.

In an embodiment, the door state circuitry 2060 comprises an electrical circuit and a sensor that senses a change in conductance. For example, the electrical circuit comprises a first conductor electrically connected to the bolt on the door end of the bolt and a second conductor located in the door jamb and electrically connected to the electrical circuit, such that when the bolt is extended and contacting the second door jamb conductor (locking the door), the electrical circuit is complete. The door state circuitry 2060 senses the conductance of the electrical circuit, which in this example is the conductance of a closed circuit, and sends a signal to the door controller 2000. In a further example, the door could be ajar and when the bolt extends, and it does not make contact with the second door jamb conductor. Again, the door state circuitry 2060 senses the conductance of the electrical circuit, which in this example is the conductance of an open circuit, and sends a signal to the door controller 2000. In other embodiments, the open circuit may indicate a locked door and a closed circuit may indicate an unlocked door.

In another embodiment, the door state circuitry 2060 comprises a sensor and a switch circuit including at least one of a magnetic switch and a capacitive switch. For example, the switch circuit is operatively connected to the door end of the bolt and senses a change of capacitance or magnetic field, respectively, when the door locks or unlocks. If, for example, the door is ajar and does not actually lock when the bolt is extended, the switch detects the lack of change in the capacitance or magnetic field, respectively. The door state circuitry 2060 sends a signal indicative of the change or lack of change to the door controller 2000.

In another embodiment, the door state circuitry 2060 comprises a proximity sensor that senses whether the bolt is extended inside the door jamb using one or more of conductive sensing, capacitive sensing and magnetic field sensing.

Receiver Interface Circuitry

In an embodiment, the processor 2015 via the receiver interface circuitry 2040 sends an interrupt to the processor circuitry 1815 to indicate that there is data ready to send to the hub 250. In another embodiment, the processor 1815 sends an interrupt via the receiver interface circuitry 2040 to the processor 2015 to indicate that there is a message from the hub 250 for the local controller 2000. In an embodiment, the local receiver 1800 and the local controller 2000 communicate using logic level serial communications, such as, for example, Inter-Integrated Circuit (I²C), Serial Peripheral Interface (SPI) Bus, an asynchronous bus, and the like.

Power Source

In an embodiment, the power source 2065 comprises a battery and a regulator to regulate the battery voltage to approximately 5 volts to power the circuitry 2015, 2020, 2035, 2040, 2045, 2050, 2060. In an embodiment, the battery comprises an approximately 1 ampere-hour battery. In other embodiments, the battery capacity is greater than 1 ampere-hour or less than 1 ampere-hour. Embodiments of the battery can be rechargeable or disposable. In an embodiment, the power source 1850 in the local receiver 1800 comprises the power source 2065 and powers the local controller 2000.

Keypad Activation

Figure 21:
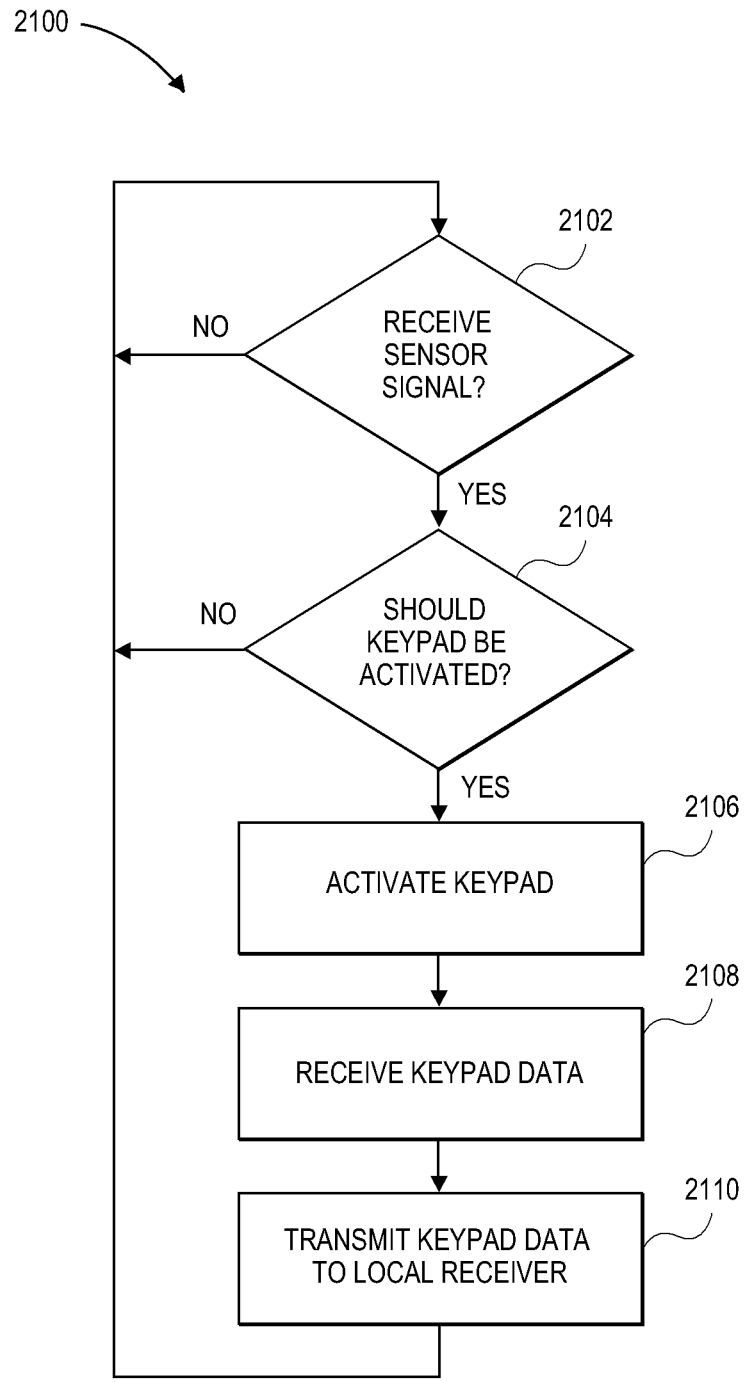
FIG. 21 illustrates a process to activate a keypad associated with a door lock, according to certain embodiments.

In some embodiments, to conserve power, the keypad 2045 is in a sleep state when not in use. The door controller 2000 determines when to wake up the keypad 2045 and allow it to accept user input. FIG. 21 illustrates a process 2100 to activate the keypad 2045 associated with the door lock 2030. In an embodiment, the process 2100 comprises a rule set 2025 stored in the memory 2020 and executed by the processor 2015 of the door controller 2000.

At step 2102, the process 2100 checks for a signal from the sensor 2050. As described above, the signal can be from a motion detector, RF envelope detector, a Bluetooth receiver, a Wi-Fi receiver, a geolocation service, a cellular modem, and the like. If no signal is received, the process 2100 returns to step 2102. If a signal is received, the process 2100 moves to step 2104.

At step 2104, the process 2100 determines whether to activate the keypad 2045, based at least in part on the information received in step 2102. In some embodiments, the presence of a user detected by the motion sensor causes the process 2100 to activate the keypad 2045. In other embodiments, the process 2100 receives additional information, such as the cell phone number associated with the mobile device in proximity to the sensor 2035. The process 2100 can compare the received cell phone number with a list of cell phone numbers associated with authorized users.

If the received cell phone number is authorized, the process 2100 at step 2106 activates the keypad 2045. At step 2108, the user enters a code using the keypad 2045 and the process 2100 receives the keypad data from the keypad 2045.

At step 2110, the process 2100 transmits the keypad data to the local receiver 1800 for transmission through the network 200 to the hub 250. In an embodiment, the keypad 2045 returns to a sleep state and the process 2100 returns to step 2102.

Door Unlock Function

In an embodiment, the hub 250 receives the keypad data from the network 200 and compares the received keypad data to the door enablement code. If the received keypad data matches the door enablement code, the hub 250 sends at least one command through the network 200 via the local receiver 1800 to the door controller 2000 instructing the door controller 2000 to unlock the door.

In another embodiment, the hub 250 sends the keypad data to the user computer 230 and the user computer 230 compares the received keypad data to the door enablement code, and if there is a match, the user computer 230 sends a command to the hub 250, which in turn sends the command through the network 200 and local receiver 1800 to the door controller 2000 to unlock the door.

In another embodiment, the door controller 2000 compares the received keypad data to the door enablement code and if there is a match, the door controller 2000 unlocks the door.

In another embodiment, the hub 250 comprises a cellular receiver and the user's mobile device comprises a global positioning signal (GPS) application and interfaces with a geolocation service. The mobile phone sends one or more of an email, a text message, an internet protocol (IP) message, and the like, when it is near the door or near the home associated with the door. The hub's cellular receiver receives the message/email. The hub 250 compares the email address, the text address, the IP address, and the like to a list of authorized email/text/IP addresses. If there is a match, based on at least a part of the received message/email, such as the subject line, the hub 250 sends a command through the network 200 via the local receiver 1800 to the door controller 2000 to unlock the door. An exemplary subject line could be "Arriving Home".

In another embodiment, the Bluetooth hardware in the phone pairs with a Bluetooth® receiver associated with one of the door lock controller 2000, the hub 250, the network 200, and the user computer 230. The Bluetooth® receiver sends data to the hub 250 or sends data to the user computer 230 that the mobile device is near the door. The hub 250 compares the phone number of the Bluetooth paired phone to a list of authorized phone numbers. If there is a match, the hub 250 sends a command through the network 200 via the local receiver 1800 to the local controller 2000 to unlock the door.

In another embodiment, the user computer 230 further comprises a Wi-Fi™ network and the Wi-Fi™ network receives the email, text message or IP message from the phone. The hub 250 pings the Wi-Fi™ network and receives the email/message. The hub 250 compares the email address, the text address, the IP address, and the like, to a list of authorized email/text/IP addresses. If there is a match, the hub 250 sends a command through the network 200 via the local receiver 1800 to the door controller 2000 to unlock the door.

In another embodiment, the hub 250 sends the received data to the user computer 230 and the user computer 230 compares the received data to the authorized data, where the data can comprise at least one of an email address, a phone number, an IP address, and a keycode, and if there is a match, the user computer 230 sends a command to the hub 250, which in turn sends the command to the door controller 2000 to unlock the door.

In another embodiment, the user through the user computer 230 sends a command to the hub 250 to unlock the door. As described above, the hub 250 sends a message comprising the command through the network 200 via the local receiver 1800 to the door controller 2000 to unlock the door.

In another embodiment, a local transmitter, such as an electronic key, operated by the user notifies the door controller 2000 to the presence of the electronic key at the door. In one embodiment, the door controller 2000 activates the keypad 2045. In another embodiment, the door controller 2000 unlocks the door in response to receiving the electronic key transmission frequency. In another embodiment, the door controller alerts the hub 250 to the presence of the electronic key and the hub 250 determines whether the electronic key is an authorized electronic key. If the electronic key is authorized, the hub 250 sends a command to the door controller 2000 to unlock the door.

Figure 22:
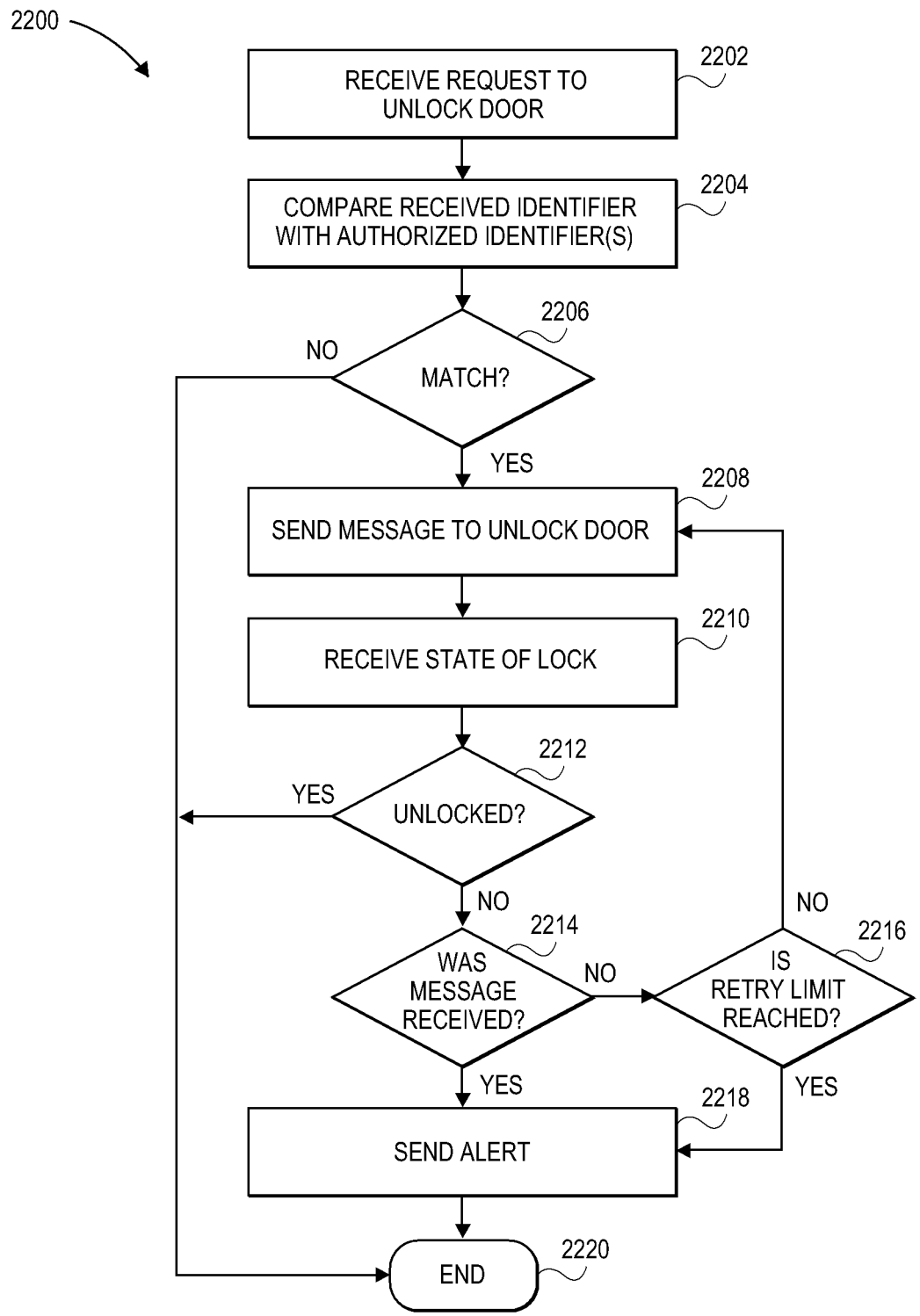
FIG. 22 illustrates a process to automatically unlock a door lock, according to certain embodiments.

FIG. 22 illustrates a process 2200 to unlock the door lock 2030. At step 2202, a request to unlock the door is received. The request comprises an identifier, such as, for example, a number keyed into the keypad, a mobile device phone number, an IP address, an email address, or the like, as described above. In an embodiment, the request is received by the hub 250, and the rule set to determine the door operations is stored in the hub 250. In other embodiments, the request is received at the door controller 2000, the local receiver 1800, or the user computer 230. In another embodiment, the rule set to determine door operations comprises distributed logic and is distributed throughout one or more of the devices 220, the local receiver 1800, and the user computer 230.

At step 2204, the process 2200 compares the received identifier with one or more identifiers authorized to unlock the door. If no match is found at step 2206, the process 2200 moves to end step 2220, where the unlock process ends. Or, in other words, the person seeking access is not authorized to unlock the door.

If a match is found, the process 2200 moves to step 2208, where a message is sent to the door controller 2000 to unlock the door. At step 2210, the door controller 2000 receives the state of the door from the door state circuitry 2060.

Based on the received state of the door, the process 2200 determines whether the door is unlocked at step 2212. If the door is unlocked, the process 2200 moves to end step 2220 where the unlock process 2200 ends.

If the door is not unlocked (or locked), the process 2200 determines at step 2214 whether the message to unlock the door was received by the local receiver 1800. In an embodiment, the local receiver 1800 sends an acknowledgement through the network 200 indicating receipt of a message addressed to it, as indicated at step 450 of FIG. 4.

If the process 2200 received the acknowledgement from the local receiver 1800, then the process 2200 moves to step 2218, where an alert is sent to the user indicating a malfunction in the unlock process. In an embodiment, the hub 250 receives the acknowledgement from the local receiver 1800. In an embodiment, the alert comprises a message sent to the user computer 230. In another embodiment, the alert comprises one or more of a text message and an email to an address associated with the user. After sending the alert, the process 2200 ends at the end step 2220.

If the process 2200 determines that the acknowledgement was not received from the local receiver 1800 at step 2214, the process 2200 determines if a retry limit is reached at step 2216. In an embodiment, the retry limit comprises the maximum number of hops as described in FIG. 3. In another embodiment, the retry limit is independent of the number of hops associated with the message and comprises a limit set by the user. In this case, the retry limit comprises the number of times the process 2200 sends the message to the door controller 2000 to unlock the door. In an embodiment, the retry limit is a small number, such as 4. In other embodiments, the retry limit is greater than or less than four. In an embodiment, the hub 250 determines if the retry limit has been reached.

If at step 2216, the number of retries has reached the retry limit, the process 2200 moves to step 2218 and the alert is sent, as described above. After sending the alert, the process 2200 ends at the end step 2220. In an embodiment, the hub 250 sends the alert as described above.

If at step 2216, the maximum number of retries has not been reached, the process 2200 returns to step 2208, where another message to unlock the door is sent. In an embodiment, the hub 250 sends another message to the door controller through the network 200 and local receiver 1800 to unlock the door.

Door Lock Function

The mechanisms to provide valid user input to lock the door are similar to that described above with respect to unlocking the door. In an embodiment, the hub 250 receives the keypad data from the network 200 and compares the received keypad data to the door enablement code. If the received keypad data matches the door enablement code, the hub 250 sends at least one command through the network 200 via the local receiver 1800 to the door controller 2000 instructing the door controller to lock the door.

In another embodiment, the hub 250 sends the keypad data to the user computer 230 and the user computer 230 compares the received keypad data to the door enablement code, and if there is a match, the user computer 230 sends a command to the hub 250, which in turn sends the command to the door controller 2000 to lock the door.

In another embodiment, the door controller 2000 compares the received keypad data to the door enablement code and if there is a match, the door controller 2000 locks the door.

In another embodiment, the hub 250 comprises a cellular receiver and the user's mobile device comprises a global positioning signal (GPS) application and/or interfaces with a geolocation service. The mobile phone sends one or more of an email, a text message, an internet protocol (IP) message, and the like, when it is near the door or near the home associated with the door. The hub's cellular receiver receives the message/email. The hub 250 compares the email address, the text address, the IP address, and the like to a list of authorized email/text/IP addresses. If there is a match, based on at least a part of the received message/email, such as for example, the subject line, the hub 250 sends a command through the network 200 via the local receiver 1800 to the door controller 2000 to lock the door. An exemplary subject line could be "Left Home".

In another embodiment, the Bluetooth® hardware in the phone pairs with a Bluetooth® receiver associated with one of the door lock controller 2000, the hub 250, the network 200, and the user computer 230. The Bluetooth® receiver sends data to the hub 250 or sends data to the user computer 230 indicating that the mobile device is near the door. The hub 250 compares the phone number of the Bluetooth® paired phone to a list of phone numbers. If there is a match, the hub 250 sends a command through the network 200 via the local receiver 1800 to the local controller 2000 to lock the door.

In another embodiment, the user computer 230 further comprises a Wi-Fi™ network and the Wi-Fi™ network receives the email, text message or IP message from the phone. The hub 250 pings the Wi-Fi™ network and receives the email/message. The hub 250 compares the email address, the text address, the IP address, and the like to a list of authorized email/text/IP addresses. If there is a match, the hub 250 sends a command through the network 200 via the local receiver 1800 to the local controller 2000 to lock the door.

In another embodiment, the hub 250 sends the received data to the user computer 230 and the user computer 230 compares the received data to the authorized data, where the data can comprise at least one of an email address, a phone number, an IP address, and the like. If there is a match, the user computer 230 sends a command to the hub 250, which in turn sends the command to the door controller 2000 to lock the door.

In another embodiment, the user through the user computer 230 sends a command to the hub 230 to lock the door. As described above, the hub 250 sends a message comprising the command through the network 200 via the local receiver 1800 to the door controller 2000 to lock the door.

In another embodiment, a local transmitter, such as an electronic key, operated by the user notifies the door controller 2000 to the presence of the electronic key at the door. In one embodiment, the door controller 2000 activates the keypad 2045. In another embodiment, the door controller 2000 locks the door in response to receiving the electronic key transmission frequency. In another embodiment, the door controller alerts the hub 250 to the presence of the electronic key and the hub 250 determines whether the electronic key is an authorized electronic key. If the electronic key is authorized, the hub 250 sends a command to the door controller 2000 to lock the door.

Figure 23:
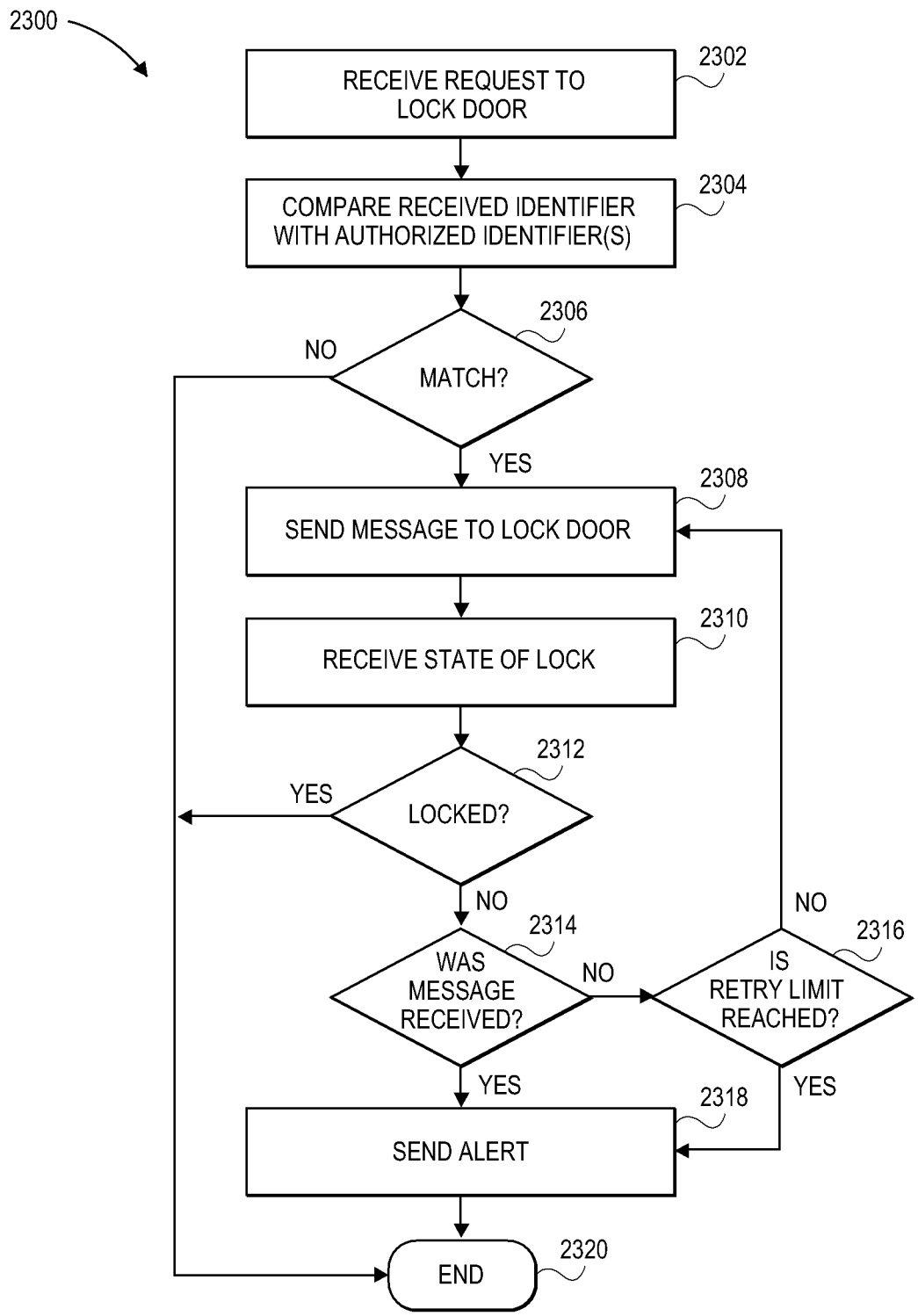
FIG. 23 illustrates a process to automatically lock a door lock, according to certain embodiments.

FIG. 23 illustrates a process 2300 to lock the door lock 2030. It should be noted that the process 2300 to lock the door is similar to the process 2200 to unlock the door. At step 2302, a request to lock the door is received. The request comprises an identifier, such as, for example, a number keyed into the keypad, a mobile device phone number, an IP address, an email address, or the like, as described above. In an embodiment, the request is received by the hub 250 and the rule set to determine the door operations is stored in the hub 250. In other embodiments, the request is received at the door controller 2000, the local receiver 1800, or the user computer 230. In another embodiment, the rule set to determine door operations comprises distributed logic and is distributed throughout one or more of the devices 220, the local receiver 1800, and the user computer 230.

At step 2304, the process 2300 compares the received identifier with one or more identifiers authorized to lock the door. If no match is found at step 2306, the process 2300 moves to end step 2320, where the lock process 2300 ends. Or in other words, the person seeking access is not authorized to lock the door.

If a match is found, the process 2300 moves to step 2308, where a message is sent to the door controller 2000 to lock the door. At step 2310, the door controller 2000 receives the state of the door from the door state circuitry 2060.

Based on the received state of the door, the process 2300 determines whether the door is locked at step 2312. If the door is locked, the process 2300 moves to end step 2320 where the lock process 2300 ends.

If the door is not locked (or unlocked), the process 2300 determines at step 2314 whether the message to lock the door was received by the local receiver 1800. In an embodiment, the local receiver 1800 sends an acknowledgement through the network 200 indicating receipt of a message addressed to it, as indicated at step 450 of FIG. 4.

If the process 2300 received the acknowledgement from the local receiver 1800, then the process 2300 moves to step 2318, where an alert is sent to the user indicating a malfunction in the lock process. In an embodiment, the alert comprises a message sent to the user computer 230. In another embodiment, the alert comprises one or more of a text message and an email to an address associated with the user. After sending the alert, the process 2300 ends at the end step 2320.

If the process 2300 determines that the acknowledgement was not received from the local receiver 1800 at step 2314, the process 2300 determines if a retry limit is reached at step 2316. In an embodiment, the retry limit comprises the maximum number of hops as described in FIG. 3. In another embodiment, the retry limit is independent of the number of hops associated with the message and comprises a limit set by the user. In this case, the retry limit comprises the number of times the process 2300 sends the message to the door controller 2000 to lock the door. In an embodiment, the retry limit is a small number, such as 4. In other embodiments, the retry limit is greater than or less than four. In an embodiment, the hub 250 determines if the retry limit has been reached.

If at step 2316, the number of retries has reached the retry limit, the process 2300 moves to step 2318 and an alert is sent, as described above. After sending the alert, the process 2300 ends at the end step 2320. In an embodiment, the hub 250 sends the alert as described above.

If at step 2316, the maximum number of retries has not been reached, the process 2300 returns to step 2308, where another message to lock the door is sent. In an embodiment, the hub 250 sends another message to the door controller 2000 through the network 200 and local receiver 1800 to unlock the door.

Overall Communications Flow

Figure 24A:
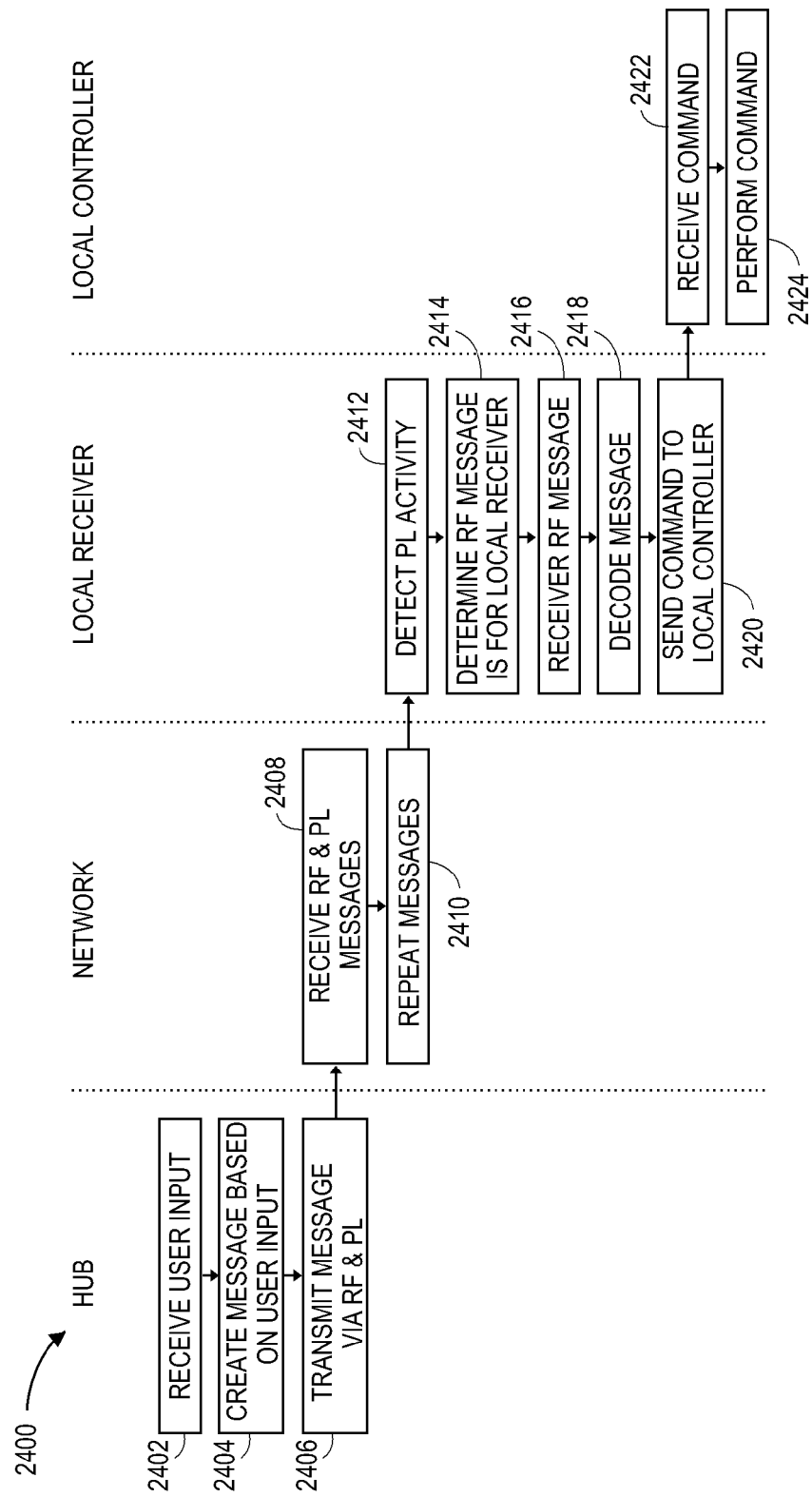
FIG. 24A illustrates the flow of communications from the hub to the local controller, according to certain embodiments.

FIG. 24A illustrates a flow of communications 2400 from the hub 250 to the local controller 2000. At step 2402, the hub 250 can receive input from a user. For example, the user can enter a command from the user computer 230 to perform an operation, such as, for example, to lock the door. At step 2404, the hub 250 creates at least one message addressed to the local receiver 1800 associated with the local controller 2000 based at least in part on the user's input. And at step 2406, the hub 250 transmits the message over the network 200 using one or more of powerline signaling and RF signaling as described above.

At step 2408, devices 220 on the network 200 receive the RF and/or powerline message, and at step 2410, the devices 220 propagate or repeat the message as described above.

At step 2412, the local receiver 1800 detects powerline activity on the network 200. In an embodiment, the antenna 1836 detects the electromagnetic field generated by the modulated carrier signal of the powerline messages and the powerline message detector 1855 sends an interrupt to the processor 1815. Once altered to the presence of messages on the powerline, the local receiver 1800 checks for RF messages addressed to it at step 2414.

Once the local receiver 1800 detects an RF messages with its address, it receives the message from the network 200 at step 2416. At step 2418, the local receiver 1800 decodes the message and at step 2420, the local receiver 1800 sends the command and/or data from the decoded message to the local controller 2000.

At step 2422, the local controller 2000 receives the command and/or data from the local receiver 1800 and at step 2424, the local controller 2000 performs the operation, such as locking the door or unlocking the door, as requested by the user.

Figure 24B:
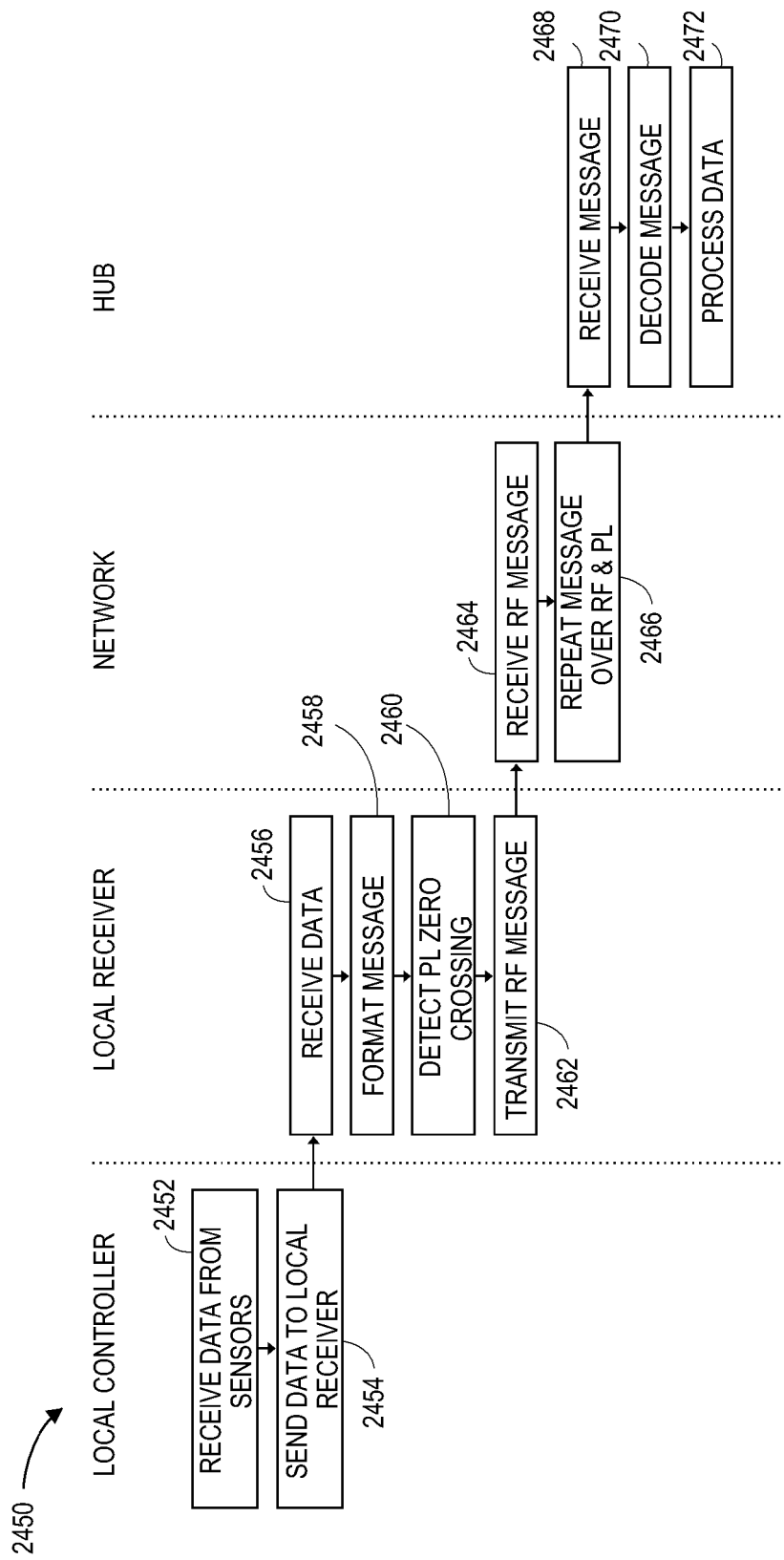
FIG. 24B illustrates the flow of communications from the local controller to the hub, according to certain embodiments.

FIG. 24B illustrates a flow of communications 2450 from the local controller 2000 to the hub 250. At step 2452, the local controller 2000 receives data from the sensors 2050. For example, the sensors 2050 detect the presence of an RF envelope from the user's cell phone. At step 2454, the local controller 2000 sends the data to the local receiver 1800.

At step 2456, the local receiver 1800 receives the data from the local controller 2000 and at step 2458, the local receiver 1800 formats a message comprising the data, as described above. At step 2460, the local receiver 1800 detects the zero crossing of the powerline in order to synchronize its RF transmission with the timing of the network 200. At step 2462, the local receiver 1800 transmits the message to the network 200 using RF signaling as described above.

At step 2464, devices 220 on the network 200 receive the RF message, and at step 2466, the devices 220 propagate or repeat the message over the network using powerline and RF signaling as described above.

At step 2468, the message propagates to the hub 250, where it is received. At step 2470, the hub 250 decodes the message and at step 2472, the hub 250 processes the data. For example, the hub 250 could determine whether the cell phone that was detected by the sensors 2050 is associated with an authorized user, and if so, could send a command to the local controller 2000 to unlock the door.

Terminology

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The words "coupled" or connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of certain embodiments is not intended to be exhaustive or to limit the invention to the precise form disclosed above. While specific embodiments of, and examples for, the invention are described above for illustrative purposes, various equivalent modifications are possible within the scope of the invention, as those ordinary skilled in the relevant art will recognize. For example, while processes, steps, or blocks are presented in a given order, alternative embodiments may perform routines having steps, or employ systems having blocks, in a different order, and some processes, steps, or blocks may be deleted, moved, added, subdivided, combined, and/or modified. Each of these processes, steps, or blocks may be implemented in a variety of different ways. Also, while processes, steps, or blocks are at times shown as being performed in series, these processes, steps, or blocks may instead be performed in parallel, or may be performed at different times.

The teachings of the invention provided herein can be applied to other systems, not necessarily the systems described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A battery-powered apparatus operating remotely from a powerline and configured to interface with a mesh network, the apparatus comprising:

a first antenna configured to wirelessly detect a presence of a first radio frequency (RF) signal having a first frequency, the presence of the first RF signal indicates that a first message is encoded onto a powerline, wherein the first antenna is electrically disconnected from the powerline;

memory storing an assigned address and a wake-up number, wherein the memory is electrically disconnected from the powerline;

a second antenna configured to detect a second RF signal having a second frequency different than the first frequency;

a third antenna configured to detect an electromagnetic signal generated by an alternating current of the powerline;

a zero-crossing detector operably coupled to the third antenna and configured to detect zero crossings of the powerline based on the electromagnetic signal, the zero-crossing detector further configured to count the detected zero crossings of the powerline;

a computer processor operably coupled to the memory and configured to wake up from an inactive state upon receipt of the presence of the first RF signal, to receive a second message comprising a device address via the second RF signal, and to determine whether the device address of the second message is the assigned address, the computer processor operably coupled to the zero-crossing detector and further configured to wake up from the inactive state when the count equals the wake-up number, the computer processor returning to the inactive state to save power when the device address of the second message is not the assigned address, wherein the computer processor is electrically disconnected from the powerline; and a power supply comprising a battery and configured to supply power, the power supply electrically connected to the memory and the computer processor.

2. The apparatus of claim 1 wherein the computer processor is further configured to format at least a part of the second message into a first serial bit stream when the device address of the second message is the assigned address.

3. The apparatus of claim 1 wherein the mesh network comprises a plurality of devices electrically coupled to the powerline and configured to transmit and receive messages synchronously using powerline signaling and radio frequency (RF) signaling based on the zero crossings of the powerline, the powerline signaling comprising data modulated onto a carrier signal having the first frequency and the data modulated carrier signal added to the powerline, the RF signaling comprising the data modulated onto the second RF signal having the second frequency.

4. The apparatus of claim 1 further comprising RF receive circuitry configured to receive the second RF signal, wherein the second RF signal is modulated with data comprising the second message, the RF receive circuitry further configured to demodulate the modulated second RF signal and recover the second message.

5. The apparatus of claim 1 further comprising a powerline message detector operably coupled to the first antenna and the computer processor and configured to wake up the computer processor from the inactive state upon the presence of the first RF signal.

6. The apparatus of claim 1 further comprising transceiver circuitry operatively coupled to the second antenna and the computer processor and configured to receive the second RF signal from the second antenna and to decode the second message from the second RF signal.

7. A battery-powered apparatus operating remotely from a powerline and configured to interface with a mesh network, the apparatus comprising:
- a first antenna configured to wirelessly detect a presence of a first radio frequency (RF) signal having a first frequency, the presence of the first RF signal indicates that a first message is encoded onto a powerline, wherein the antenna is electrically disconnected from the powerline;
- memory storing an assigned address, wherein the memory is electrically disconnected from the powerline;
- a second antenna configured to detect a second RF signal having a second frequency different than the first frequency;
- a third antenna configured to detect an electromagnetic signal generated by the alternating current of the powerline; and
- a zero-crossing detector operably coupled to the third antenna and configured to detect the zero crossings of the powerline based on the electromagnetic signal;
- a computer processor operably coupled to the memory and to the zero-crossing detector, and configured to wake up from an inactive state based at least in part on the presence of the first RF signal and the detected zero crossings of the powerline, the computer processor further configured to receive a second message comprising a device address via the second RF signal and to determine whether the device address of the second message is the assigned address, the computer processor returning to the inactive state to save power when the device address of the second message is not the assigned address, wherein the computer processor is electrically disconnected from the powerline; and
- a power supply comprising a battery and configured to supply power, the power supply electrically connected to the memory and the computer processor.

8. The apparatus of claim 7 wherein the computer processor further wakes up during an RF message transmission period of the mesh network and is inactive between a beginning of a first packet of a powerline message and an end of a last packet of the powerline message.

9. The apparatus of Claim 7 further comprising a carrier-signal detector operably coupled to the first antenna and the computer processor and configured to generate an interrupt based on the presence of the first RF signal.

10. The apparatus of Claim 7 wherein the first message and the second message are the same.

11. The apparatus of Claim 7 wherein the first message and the second message are different.

12. A method to conserve power and interface with a mesh network, the method comprising:
- wirelessly detecting with a first antenna a presence of a first radio frequency (RF) signal having a first frequency, the presence of the first RF signal indicates that a first message is encoded onto a powerline, the first antenna electrically disconnected from the powerline;
- waking up a computer processor from an inactive state based on the presence of the first RF signal, the computer processor electrically disconnected from the powerline;
- after waking up the computer processor, wirelessly receiving with a second antenna a second RF signal having a second frequency different than the first frequency and comprising a second message that includes a device address, and determining whether the device address of the second message is an assigned address;
- returning the computer processor to the inactive state to save power when the device address of the second message is not the assigned address;
- detecting the zero crossings of the powerline, counting the zero crossings, and generating an interrupt to further wake up the computer processor when the zero-crossing count reaches a wake-up count; and supplying operating power to the computer processor from a battery-operated power supply and not supplying the operating power from the powerline.

13. The method of claim 12 further comprising formatting at least a part of the second message into a first serial bit stream when the device address of the second message is the assigned address.

14. The method of claim 12 further generating an interrupt based on the presence of the first RF signal.

15. The method of claim 12 wherein the second message is the same as the first message.

16. The method of claim 12 wherein the inactive state is a sleep state.

17. The method of claim 12 wherein the inactive state is an off state.

18. The method of claim 12 further comprising not receiving the device address from the first RF signal.

19. The method of claim 12 wherein the computer processor further wakes up during an RF message transmission period of the mesh network and is inactive between a beginning of a first packet of a powerline message and an end of a last packet of the powerline message.

20. A method to conserve power and interface with a mesh network, the method comprising:
- wirelessly detecting with a first antenna a presence of a first radio frequency (RF) signal having a first frequency, the presence of the first RF signal indicates that a first message is encoded onto a powerline, the antenna electrically disconnected from the powerline;
- detecting at least one zero crossing of the powerline;
- waking up a computer processor from an inactive state based on the presence of the first RF signal and the at least one zero crossing of the powerline, the computer processor electrically disconnected from the powerline;
- after waking up the computer processor, wirelessly receiving with a second antenna a second RF signal having a second frequency different than the first frequency and comprising a second message that includes a device address, and determining whether the device address of the second message is an assigned address;
- returning the computer processor to the inactive state to save power when the device address of the second message is not the assigned address; and supplying operating power to the computer processor from a battery-operated power supply and not supplying the operating power from the powerline.

\* \* \* \* \*